(12) United States Patent
Halbritter et al.

(10) Patent No.: US 11,724,465 B2
(45) Date of Patent: Aug. 15, 2023

(54) METHOD AND SYSTEMS USING INDEPENDENTLY CONTROLLED PALLETS FOR FABRICATING COMPOSITE STRINGERS

(71) Applicant: The Boeing Company, Chicago, IL (US)

(72) Inventors: Allen Halbritter, Charleston, SC (US); Andrew J. Maass, Mt. Pleasant, SC (US)

(73) Assignee: The Boeing Company, Chicago, IL (US)

( * ) Notice: Subject to any disclaimer, the term of this patent is extended or adjusted under 35 U.S.C. 154(b) by 523 days.

(21) Appl. No.: 16/811,784

(22) Filed: Mar. 6, 2020

(65) Prior Publication Data
US 2021/0276274 A1 Sep. 9, 2021

(51) Int. Cl.
*B64C 1/00* (2006.01)
*B29D 99/00* (2010.01)
*B29C 65/00* (2006.01)
*B64C 1/06* (2006.01)

(52) U.S. Cl.
CPC ........ *B29C 66/81455* (2013.01); *B64C 1/064* (2013.01); *B29D 99/0003* (2013.01); *B29D 99/0014* (2013.01)

(58) Field of Classification Search
CPC ......... B29C 66/00; B29C 66/80; B29C 66/81; B29C 66/814; B29C 66/8145; B29C 66/81455; B64C 1/00; B64C 1/06; B64C 1/064; B29D 99/00; B29D 99/0003; B29D 99/001; B29D 99/0014
See application file for complete search history.

(56) References Cited

U.S. PATENT DOCUMENTS

| 6,179,956 | B1 * | 1/2001 | Nagahara | B24B 37/30 |
| | | | | 438/692 |
| 2011/0214807 | A1 * | 9/2011 | Muramoto | H01L 21/67092 |
| | | | | 156/281 |
| 2013/0025114 | A1 * | 1/2013 | Izu | H01L 21/6838 |
| | | | | 269/21 |
| 2018/0339463 | A1 * | 11/2018 | Stone | B25B 11/005 |

* cited by examiner

*Primary Examiner* — Jacob T Minskey
*Assistant Examiner* — Matthew Hoover
(74) *Attorney, Agent, or Firm* — Kwan & Olynick LLP

(57) ABSTRACT

Described herein are methods and systems for manufacturing composite stringers using independently movable pallets with independent vacuum controls. Specifically, a stringer forming system comprises a base plate and a plurality of sets of pallets (e.g., two or more sets of pallets), slidably coupled to the base plate and forming an adjustable cavity. Each pallet comprises a primary vacuum zone, fluidly connected to a separate vacuum port. The system allows for independent application of a reduced pressure to the primary vacuum zone of each pallet. For example, a reduced pressure is applied only to pallets that are already covered with a composite layup and to pallets that are being covered. Any pallets that are exposed are kept at an ambient pressure and decoupled from a vacuum source, thereby reducing the vacuum leakage through the overall system. As the composite layup is being formed over new pallets, these new pallets are subjected to the reduced pressure.

20 Claims, 18 Drawing Sheets

METHOD AND SYSTEMS USING INDEPENDENTLY CONTROLLED PALLETS FOR FABRICATING COMPOSITE STRINGERS

BACKGROUND

Modern aircraft designs use various components, such as stringers, to resist bending, torsional, shear, and direct loads. Stringers are typically formed from lightweight composites comprising, e.g., a tape or a fabric with fibers embedded into a resin matrix. A composite layup is processed using a forming tool to define the stringer shape. However, supporting composite layups in forming tools has been challenging. For example, one approach is to apply a reduced pressure to various features, formed on a surface of a forming tool. However, when a large portion of the surface remains exposed (e.g., initially), the ambient air enters these exposed features and counters the effects of the vacuum source, fluidly coupled to these features. Therefore, maintaining a reduced pressure is challenging, even with a partially covered surface, resulting in a weak support. Furthermore, maintaining fluid connections to vacuum sources is challenging when the pallets of a forming tool move, e.g., to adjust the cavity size in the tool. The challenge only increases when a specific sequence of moving the pallets and applying the reduced pressure is needed.

What is needed are new methods and systems for manufacturing composite stringers using independent controlled pallets.

SUMMARY

Described herein are methods and systems for manufacturing composite stringers using independently movable pallets with independent vacuum controls. Specifically, a stringer forming system comprises a base plate and a plurality of sets of pallets (e.g., two or more sets of pallets), slidably coupled to the base plate and forming an adjustable cavity. Each pallet comprises a primary vacuum zone, fluidly connected to a separate vacuum port. The system allows for independent application of a reduced pressure to the primary vacuum zone of each pallet. For example, a reduced pressure is applied only to pallets that are already covered with a composite layup and to pallets that are being covered. Any pallets that are exposed are kept at an ambient pressure and decoupled from a vacuum source, thereby reducing the vacuum leakage through the overall system. As the composite layup is being formed over new pallets, these new pallets are subjected to the reduced pressure.

In some examples, a stringer forming system for fabricating a composite stringer is provided. The stringer forming system comprises a base plate, a first plurality of pallets, slidably coupled to the base plate, and a second plurality of pallets, slidably coupled to the base plate and configured to interlock with the first plurality of pallets and to form an adjustable cavity, when interlocked with the first plurality of pallets. The adjustable cavity is configured to receive a hat portion of the composite stringer. Each pallet of the first plurality of pallets and the second plurality of pallets comprises a processing surface and a primary vacuum zone, on the processing surface, fluidly connected to a primary vacuum port. The primary vacuum port of each pallet of the first plurality of pallets and of the second plurality of pallets is independently controlled.

In some examples, a pallet assembly comprises a first pallet and a second pallet. Each of the first pallet and the second pallet comprises a plurality of interlocking protrusions and a plurality of interlocking openings such that the plurality of interlocking protrusions of the first pallet is configured to slide into the plurality of interlocking openings of the second pallet. Furthermore, the plurality of interlocking protrusions of the second pallet is configured to slide into the plurality of interlocking openings of the first pallet thereby forming an adjustable cavity. Each of the first pallet and the second pallet comprises a processing surface and a primary vacuum zone, on the processing surface and fluidly connected to a primary vacuum port, which is independently controlled.

In some examples, a method of forming a stringer using a stringer forming system is disclosed. The method comprises interlocking a first plurality of pallets and a second plurality of pallets on a base plate thereby forming an adjustable cavity in between the first plurality of pallets and the second plurality of pallets. The first plurality of pallets and the second plurality of pallets comprise a first interlockable pallet pair and a second interlockable pallet pair, offset relative to the first interlockable pallet pair along the adjustable cavity. Each pallet of the first plurality of pallets and of the second plurality of pallets comprises a processing surface and a primary vacuum zone on the processing surface. The method also comprises forming a composite layup over the processing surface of each pallet of the first interlockable pallet pair while the primary vacuum zone of each pallet of the first interlockable pallet pair is subjected to a reduced pressure. While the primary vacuum zone of each pallet of the first interlockable pallet pair is subjected to a reduced pressure, the primary vacuum zone of each pallet of the second interlockable pallet pair is at an ambient pressure and the processing surface of each pallet of the second interlockable pallet pair is free from the composite layup. The method further comprises forming the composite layup over the processing surface of each pallet of the second interlockable pallet pair while the primary vacuum zone of each pallet of the second interlockable pallet pair is subjected to the reduced pressure.

DETAILED DESCRIPTION

Figure 1A:
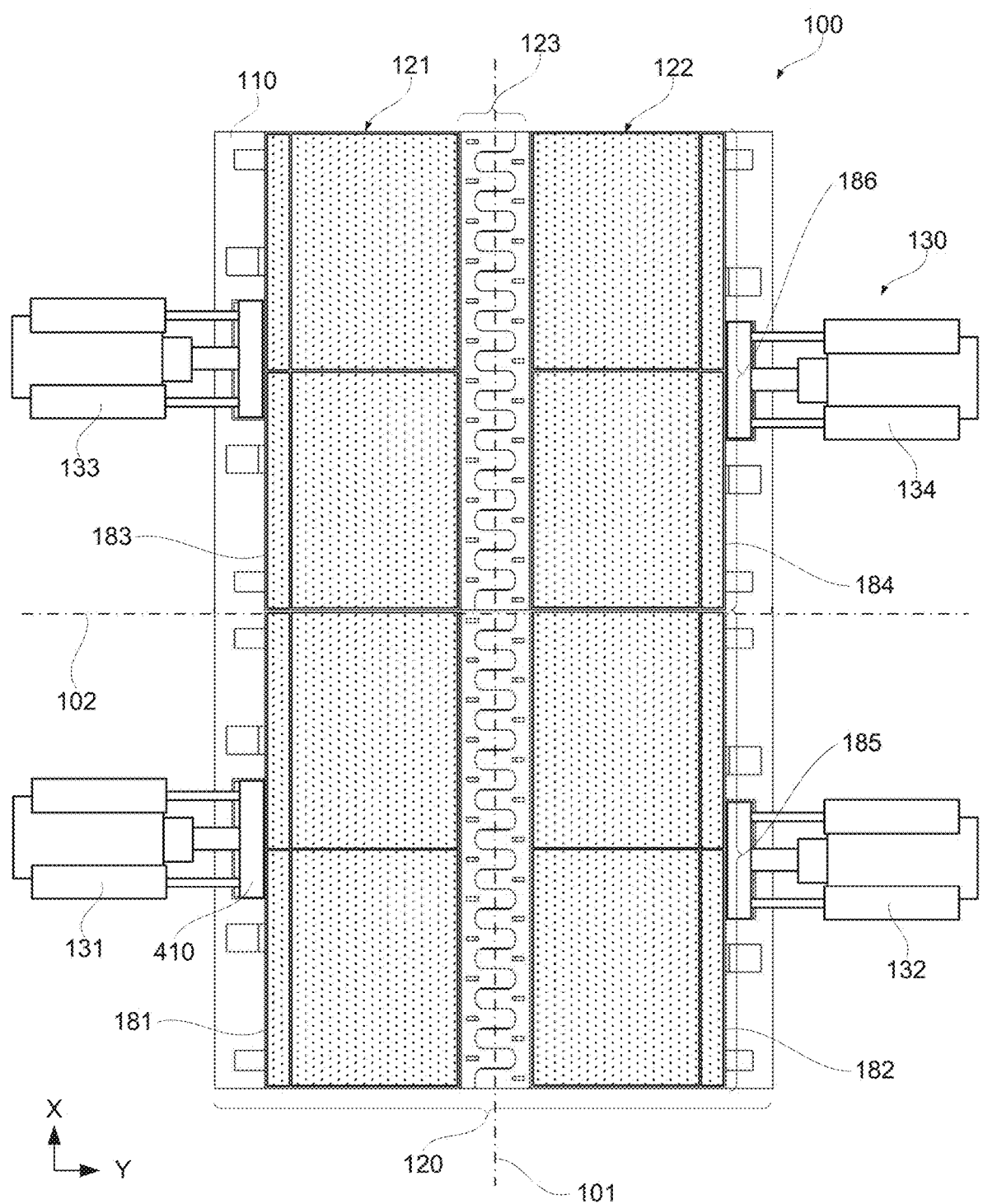
FIG. 1A is a schematic top view of a stringer forming system, showing a first plurality of pallets and a second plurality of pallets, coupled to actuators and forming an adjustable cavity, in accordance with some examples of the present disclosure.

In the following description, numerous specific details are set forth in order to provide a thorough understanding of the presented concepts. In some examples, the presented concepts are practiced without some or all of these specific details. In other instances, well known process operations have not been described in detail so as to not unnecessarily obscure the described concepts. While some concepts will be described in conjunction with the specific examples, it will be understood that these examples are not intended to be limiting.

INTRODUCTION

As noted above, stringer manufacturing has various challenges. One challenge involves supporting a composite layup on the processing surface of a forming tool, e.g., to maintain orientation while forming a hat portion. When a vacuum source is used to apply a reduced pressure to vacuum channels, provided on the processing surface, the effect of the vacuum source is substantially reduced due to the vacuum leaks at exposed portions of the surface. In some examples, a processing surface is over 1 meter long, and the process takes some time to cover this entire surface with a composite layup. While some portions of the surface remain exposed, allowing air to leak from the ambient environment into the vacuum channels, a reduced pressure, in a portion covered with the composite layup, is not sufficient to support the composite layup.

Furthermore, in some examples, a forming tool comprises multiple movable pallets, which change their positions during various stages of the overall manufacturing process. For example, the pallets are moved to change the size of a cavity, used to form a stringer hat by protruding a portion of a composite layup into the cavity. In specific examples, a specific sequence of adjusting the pallets positions and applying the reduced pressure is needed, which further complicated the overall process.

Described methods and systems address these challenges by providing independent vacuum controls to each pallet, which are selectively switchable at any time. Specifically, a stringer forming system comprises multiple pallets, positioned along the principal axis of the system. In some examples, the principal axis is defined by a cavity, used to form stringer hats, Each pallet comprises a primary vacuum zone, fluidly connected to a separate and independently controlled vacuum port. A composite layup is gradually positioned on the processing surface of these pallets, along the principal axis. A reduced pressure is applied only to the pallets that have already been covered with the composite layup and to the pallets that are being covered. Any pallets that are still exposed and free from the composite layup are kept at the ambient pressure and disconnected from the vacuum source. This separation reduces the vacuum leakage through the system and improving the efficiency of the vacuum course. As a result of this lower leakage, lower pressure levels are possible in comparison to conventional systems, which allow vacuum leaks through exposed portions. As the composite layup is being formed over new pallets, the primary vacuum zones of these pallets are fluidly coupled to a vacuum source, and these zones are subjected to the reduced pressure. Overall, the reduced pressure is applied to pallets, in a step-by-step sequential manner, along the principal axis of the system. This sequence depends on the application speed of the composite layup and the pallet length, along the principal axis.

Examples of Stringer Forming System

FIG. 1A is a schematic top view of stringer forming system 100 for fabricating composite stringer 190, in accordance with some examples. Stringer forming system 100 comprises base plate 110, first plurality of pallets 121, and second plurality of pallets 122. As illustrated in FIG. 1A, first plurality of pallets 121 comprises first pallet 181 and third pallet 183, while second plurality of pallets 122 comprises second pallet 182 and fourth pallet 184. Furthermore, first pallet 181 and second pallet 182 form first interlockable pallet pair 185, while third pallet 183 and fourth pallet 184 form second interlockable pallet pair 186.

At least one of first plurality of pallets 121 and second plurality of pallets 122 is slidably coupled to base plate 110. In some examples, each of first plurality of pallets 121 and second plurality of pallets 122 is slidably coupled to base plate 110. The sliding direction for any slidable pallets is along second direction 102, parallel to V-axis. Various examples of this slidable coupling are described below with reference to FIG. 3A. First plurality of pallets 121 and/or second plurality of pallets 122 is slidably coupled to base plate 110, e.g., to bring first plurality of pallets 121 closer to second plurality of pallets 122 or further away from second plurality of pallets 122 and change the size of adjustable cavity 123 formed by these pallets.

Figure 6A:
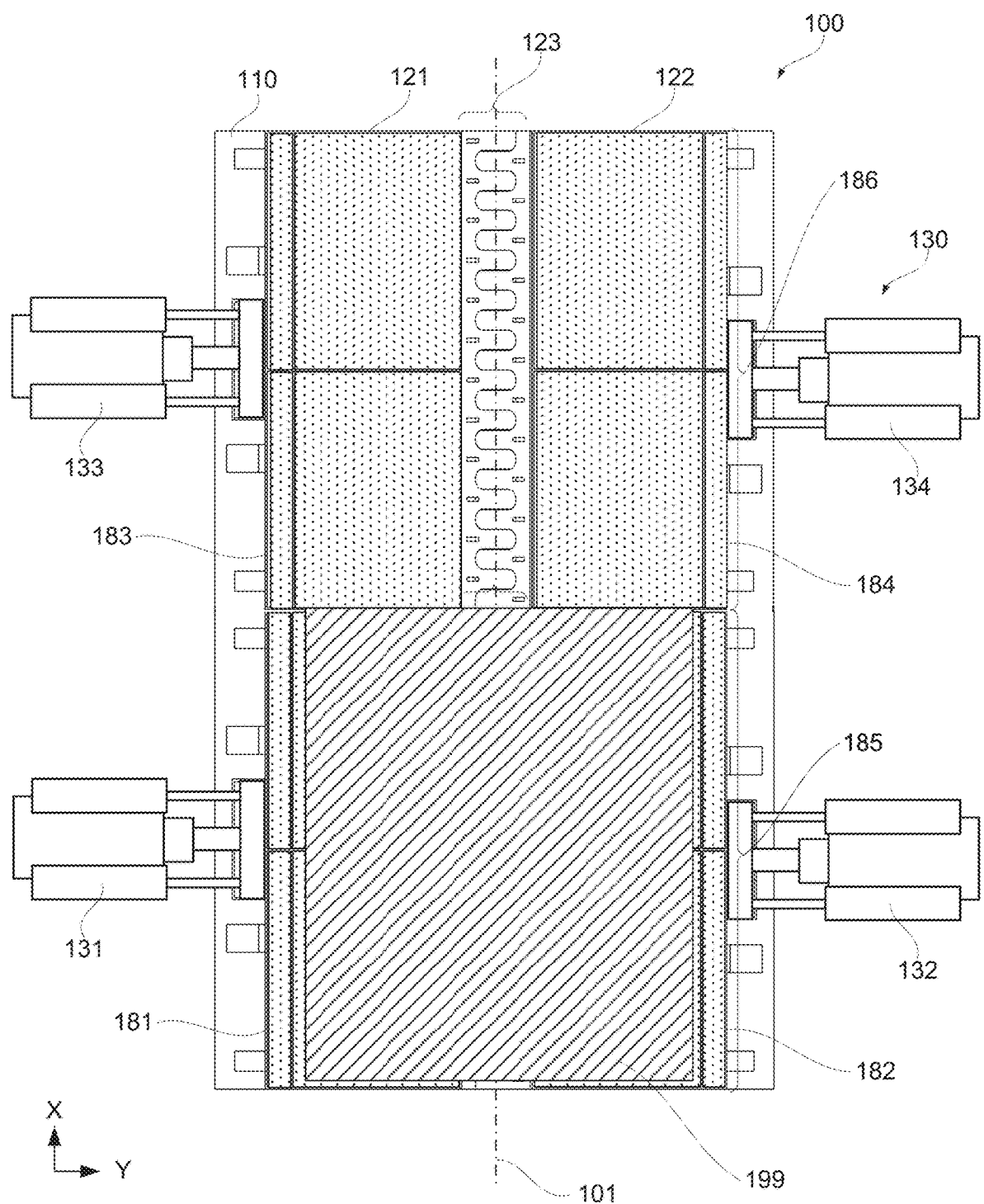
FIG. 6A is a schematic top view of a stringer forming system, showing a first interlockable pallet pair covered with a composite layup, while a second interlockable pallet pair is exposed and free from the composite layup, in accordance with some examples of the present disclosure.
Figure 6B:
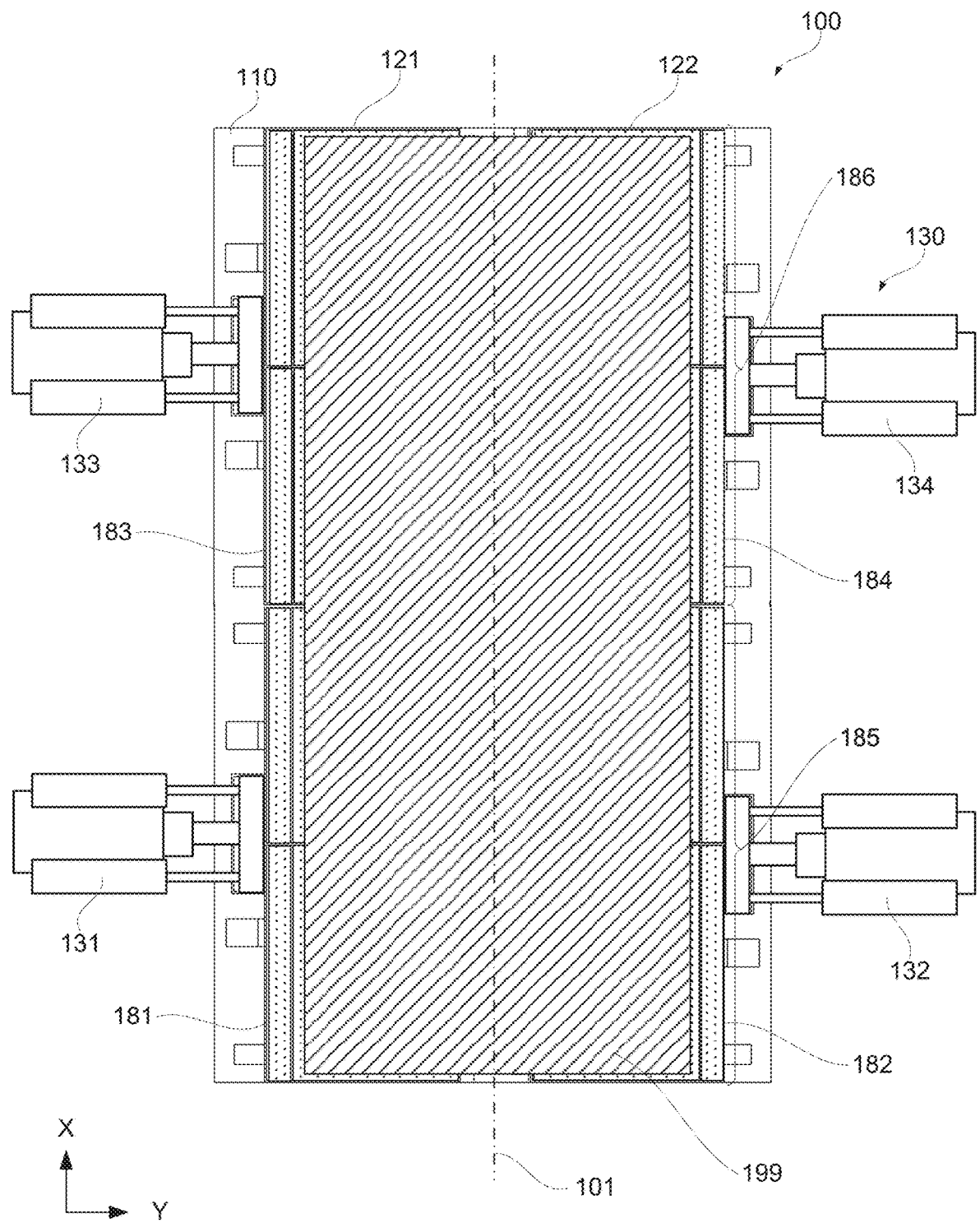
FIG. 6B is a schematic top view of a stringer forming system, showing both first and second interlockable pallet pairs covered with a composite layup, in accordance with some examples of the present disclosure.

Furthermore, first plurality of pallets 121 and second plurality of pallets 122 are configured to interlock with each other to form adjustable cavity 123. These interlocking features are described below with reference to FIGS. 3A and 3B. Adjustable cavity 123 is configured to receive hat portion 191 of composite stringer 190, during fabrication of composite stringer 190 on stringer forming system 100 as, for example, is schematically shown in FIG. 6D and described below.

FIG. 1A illustrates first pallet 181 and third pallet 183 are offset relative each other along first direction 101, extending along adjustable cavity 123. Similarly, second pallet 182 and fourth pallet 184 are offset relative each other along first direction 101. FIG. 1A also defines a coordinate system for stringer forming system 100, such that first direction 101 is parallel to the X-axis. Various references to this coordinate system are made below. In general, first interlockable pallet pair 185 is offset relative to second interlockable pallet pair 186 along first direction 101. This offset is used for sequential application of a reduced pressure to processing surface 124 of the pallets.

Figure 1B:
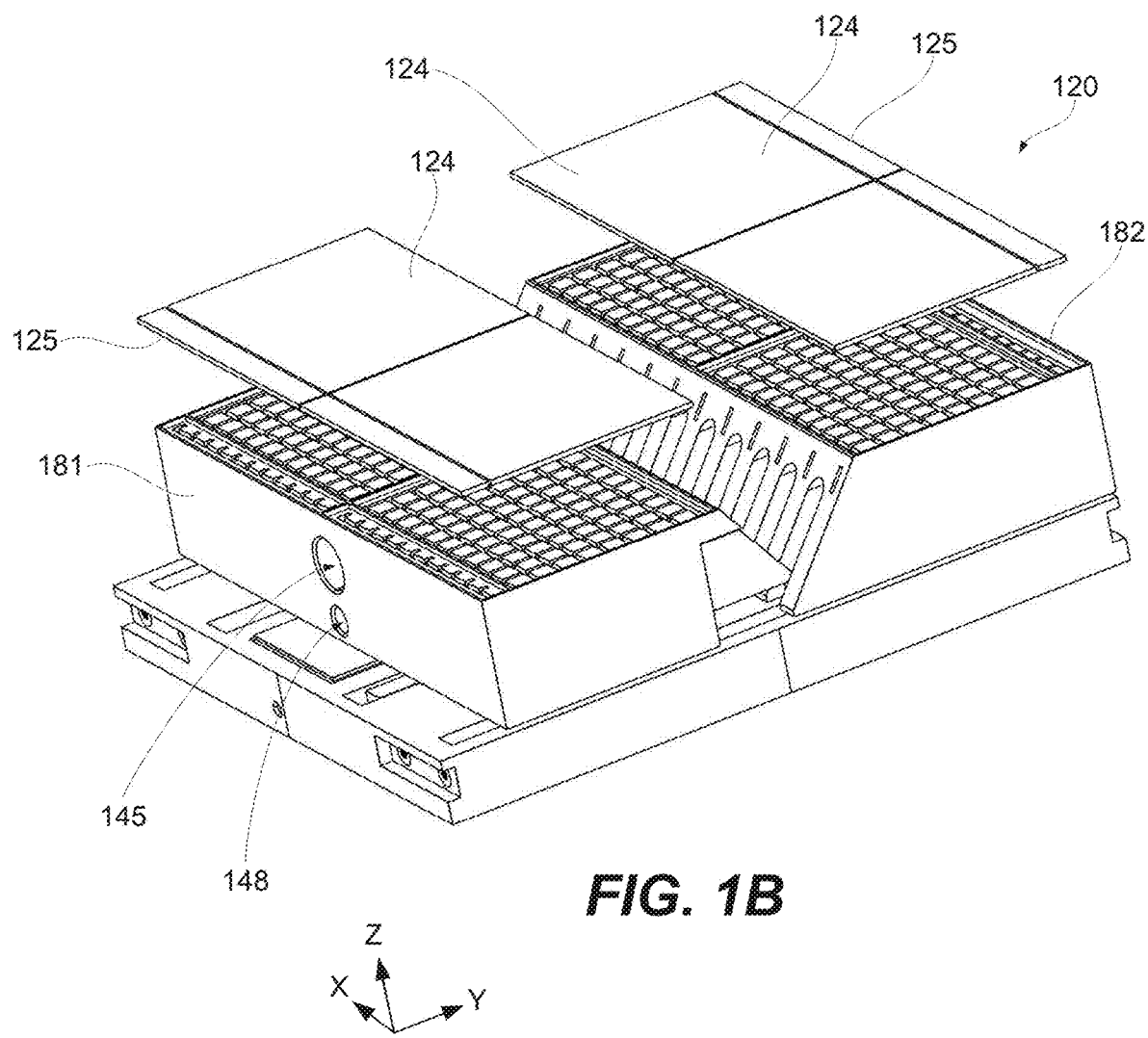
FIG. 1B is a schematic perspective view of two interlocked pallets, showing cover plates, lifted from bases of the pallets, in accordance with some examples of the present disclosure.

Each pallet of first plurality of pallets 121 and second plurality of pallets 122 comprises processing surface 124 and primary vacuum zone 140, on processing surface 124. For example, FIG. 1B illustrates first pallet 181 and second pallet 182, interlocking with each other and each comprising processing surface 124, formed by cover plates 125 of the respective pallets. Cover plates 125 are parts of first pallet 181 and second pallet 182 and are permeable to gasses thereby providing reduced pressure at processing surface 124. Cover plates 125 have more uniform surfaces in comparison to underlying pallets surfaces, which may have grooves and other features for gas redistribution. The surface uniformity ensures that composite layup 199 has the same surface profile. A combination of two interlockable pallets may be referred to as pallet assembly 120. For instance, in an example, first pallet 181 and second pallet 182 form pallet assembly 120. In another example, third pallet 183 and fourth pallet 184 form pallet assembly 120. In some examples, processing surface 124 of first pallet 181 is coplanar to processing surface 124 of second pallet 182. In more specific examples, the processing surfaces of all pallets in stringer forming system 100 are coplanar. However, the shape of processing surface 124 is generally determined by the overall profile of composite stringer 190 or, more specifically, by flange portions of composite stringer 190.

Primary vacuum zone 140 of each pallet is fluidly connected to dedicated primary vacuum port 145. Primary vacuum port 145 of each pallet is independently controlled. In other words, primary vacuum port 145 of each pallet is independently connectable to vacuum source 189 (shown in FIG. 2A), e.g., a vacuum pump. Even through the same vacuum pump is used, in some examples, for all pallets of stringer forming system 100, the fluid coupling to each primary vacuum port 145 is independently controlled, e.g., by one of plurality of actuators 130 as further described below.

Figure 1C:
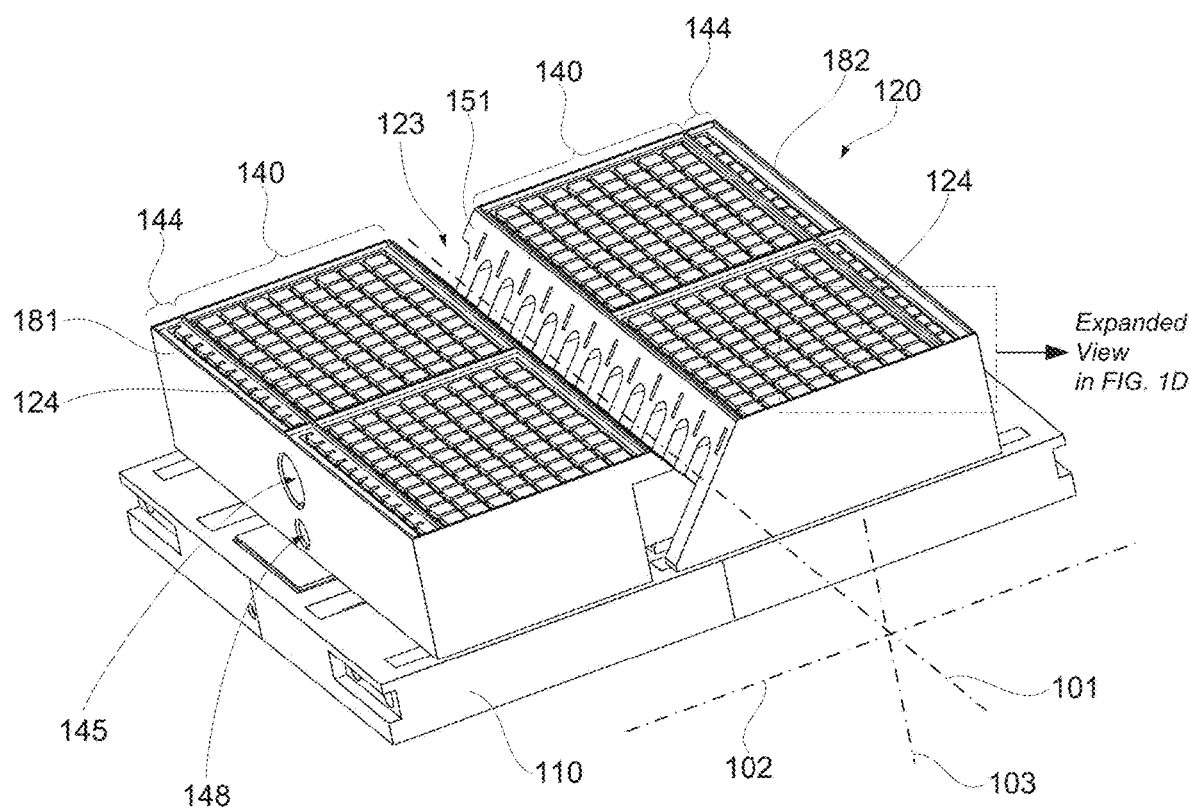
FIG. 1C is a schematic perspective view of two interlocked pallets, with cover plates removed, showing vacuum ports on the side of one pallet, in accordance with some examples of the present disclosure.
Figure 1C:
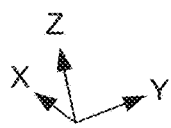

FIGS. 1B and 1C illustrate primary vacuum port 145 positioned on a side of first pallet 181. This side faces away from adjustable cavity 123 and is used to connect to an actuator. Actuators are not shown in FIGS. 1B and 1C for clarity. As further described below, in some examples, primary vacuum port 145 is fluidly coupled to extendable arm 170 of a corresponding actuator, Extendable arm 170 provides controlled coupling between primary vacuum port 145 and vacuum source 189.

Figure 1D:
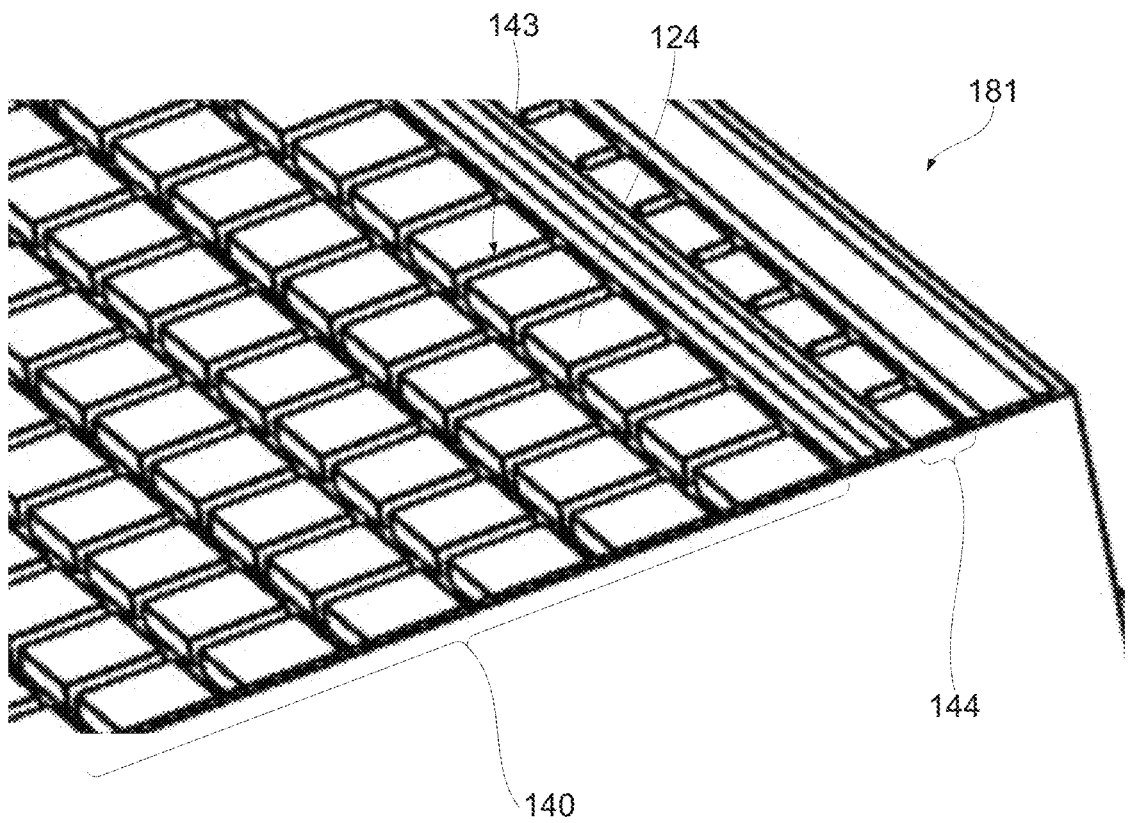
FIG. 1D is a schematic perspective view of a pallet processing surface, showing a plurality of vacuum channels, in accordance with some examples of the present disclosure.

Referring to FIG. 1D, in some examples, primary vacuum zone 140 is defined by plurality of vacuum channels 143, forming a grid and extending through processing surface 124. Plurality of vacuum channels 143 are fluidly connected to primary vacuum port 145, through various internal channels within the pallet. When composite layup 199 is positioned on processing surface 124 and a reduced pressure is applied to plurality of vacuum channels 143, the pressure gradient (between the reduced pressure and the ambient pressure) forces composite layup 199 against processing surface 124 thereby securing composite layup 199 on processing surface 124. In some examples, the reduced pressure inside plurality of vacuum channels 143 is specifically controlled to provide different levels of this force.

Referring to FIGS. 1B-1D, in some examples, each pallet of first plurality of pallets 121 and second plurality of pallets 122 comprises edge vacuum zone 144. Edge vacuum zone 144 is fluidly connected to edge vacuum port 148, shown in FIGS. 1.13 and 1C. The location of edge vacuum zone 144 on processing surface 124 is such that primary vacuum zone 140 is positioned between edge vacuum zone 144 and adjustable cavity 123, Edge vacuum zone 144 is used, for example, to support a porous barrier sheet, which is positioned over processing surface 124 and between processing surface 124 and composite layup 199.

In some examples, composite layup 199 does not extend to edge vacuum zone 144 and only covers primary vacuum zone 140. On the other hand, the porous barrier sheet extends to and over edge vacuum zone 144 and covers both primary vacuum zone 140 and edge vacuum zone 144. In some examples, edge vacuum zones 144 of multiple pallets are maintained at the same pressure. Therefore, a reduced pressure is applied to all edge vacuum zones at the same time. However, edge vacuum zones 144 have a much smaller surface area than primary vacuum zones 140 and, as a result, the vacuum leakage through edge vacuum zones 144 is smaller than through primary vacuum zones 140. Furthermore, the barrier sheet is applied faster than composite layup 199, and the vacuum leakage through edge vacuum zones 144 is not as long, Finally, in some examples, the porous barrier sheet is required less support than composite layup 199 since composite layup 199 is later forces the porous barrier sheet against processing surface 124.

Figure 2A:
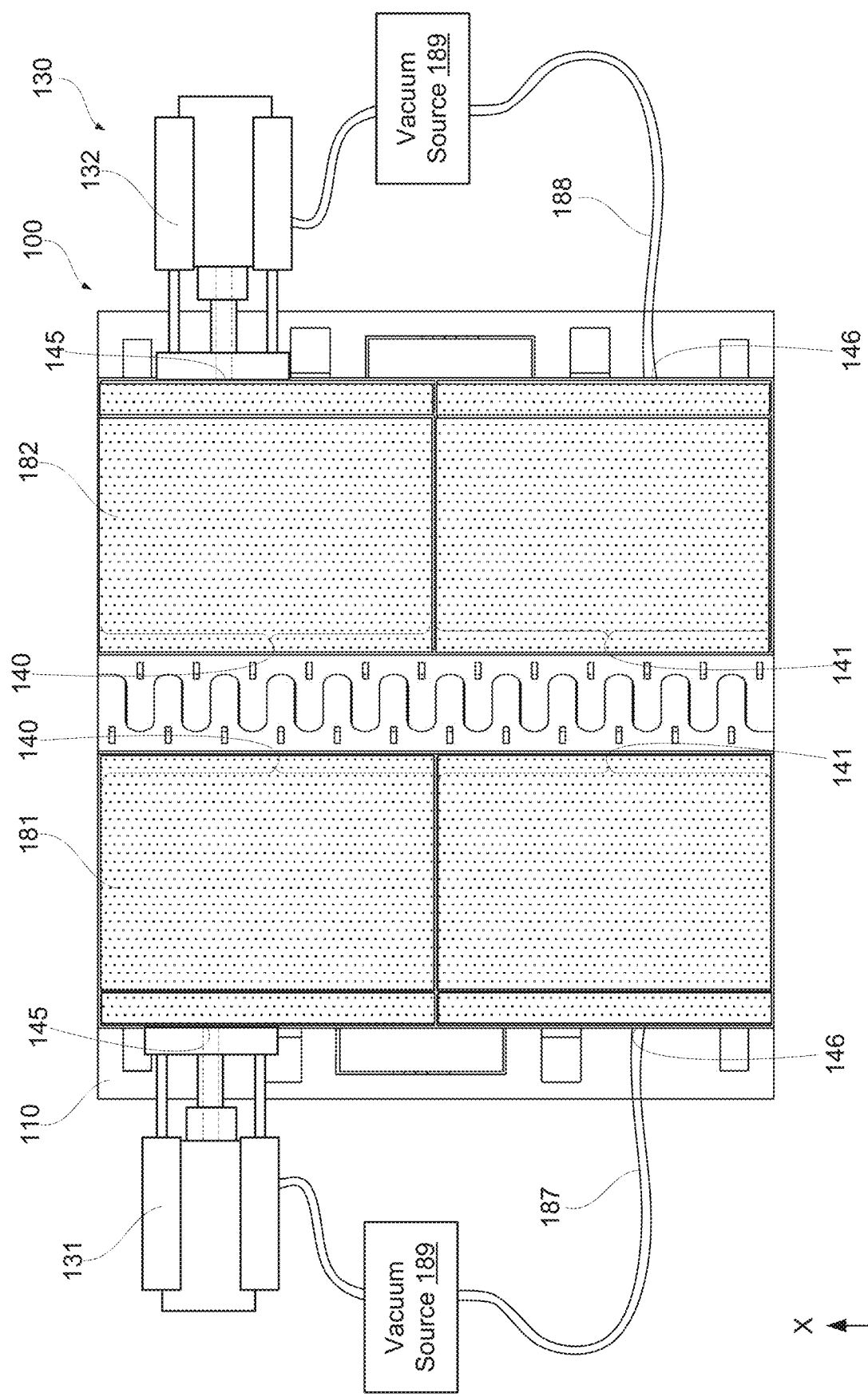
FIG. 2A is a schematic top view of two interlocked pallets, such that each pallet has two primary vacuum zones, which are independently controlled and fluidically coupled to different vacuum ports, in accordance with some examples of the present disclosure.

In some examples, each edge vacuum zone 144 is connected to an independently controlled vacuum source, e.g., vacuum source 189 shown in FIG. 2A. In other words, the reduced pressure applied to each edge vacuum zone 144 is independently controlled using a mechanism similar to controlling the reduced pressure of primary vacuum zone 140. It should be noted that, in some examples, the reduced pressure of primary vacuum zone 140 is different from the reduced pressure of edge vacuum zone 144.

Figure 2B:
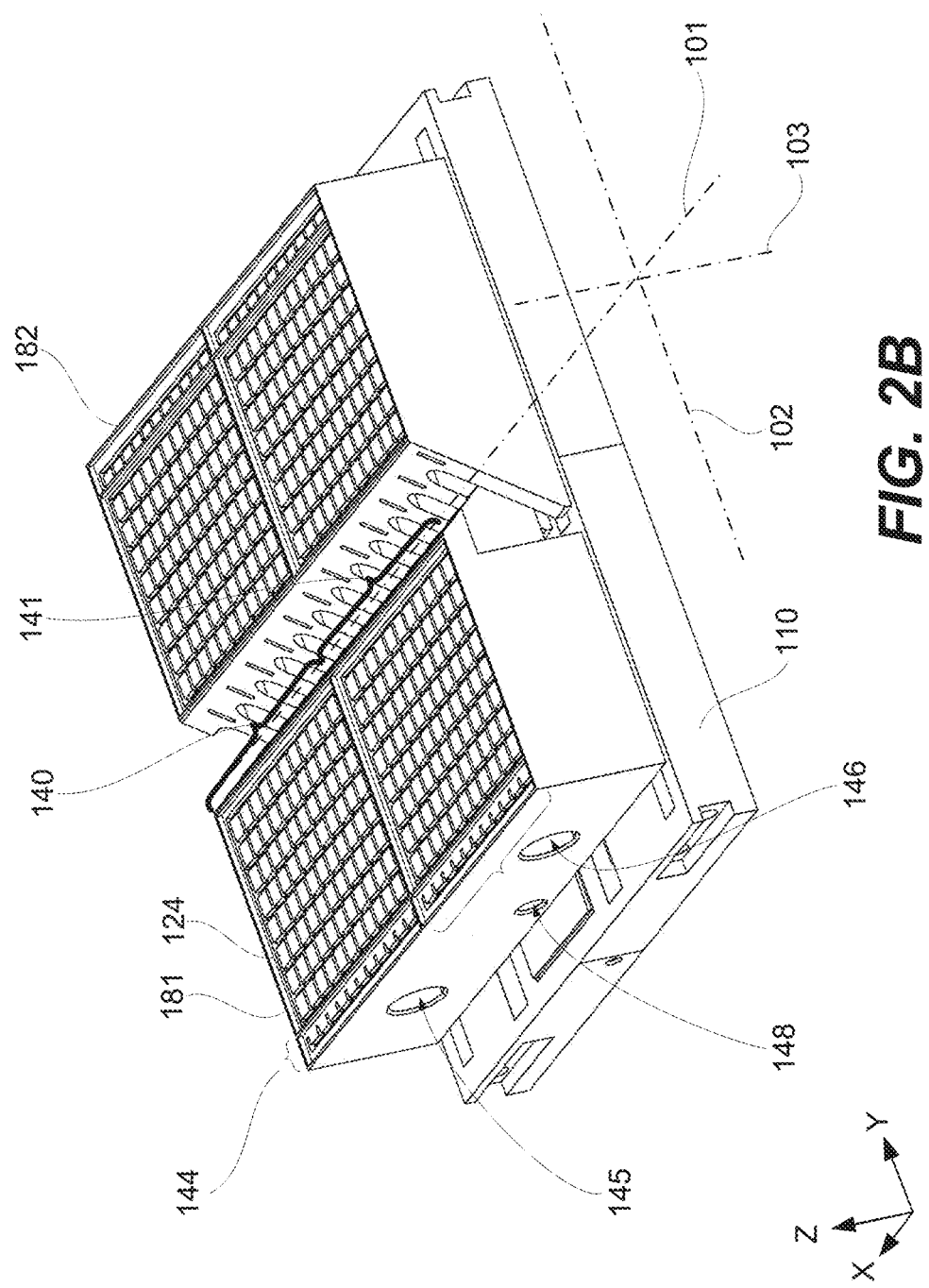
FIG. 2B is a schematic perspective view of the two interlocked pallets in FIG. 2A, showing different vacuum ports on the side of one pallet, in accordance with some examples of the present disclosure.

Referring to FIGS. 2A and 2B, in some examples, each pallet of first plurality of pallets 121 and second plurality of pallets 122 comprises, in addition to primary vacuum zone 140, additional primary vacuum zone 141, on processing surface 124 and fluidly connected to additional primary vacuum port 146, Additional primary vacuum zone 141 and primary vacuum zone 140 are positioned on the same processing surface 124 of the pallet, Additional primary vacuum port 146 is independently controlled, from primary vacuum port 145. For example, FIG. 2A illustrates additional primary vacuum port 146 of first pallet 181 connected or, more specifically, fluidically coupled to first flexible vacuum supply 187. Additional primary vacuum port 146 is different from primary vacuum port 145, which is fluidically coupled to primary vacuum zone 140, Primary vacuum port 145 of first pallet 181 is connected or, more specifically, fluidically coupled to first actuator 131. It should be noted that first actuator 131 is also responsible for translating first pallet 181 relative to base plate 110, in addition to providing a reduced pressure to additional primary vacuum zone 141. Overall, the pressure of primary vacuum zone 140 and the pressure of additional primary vacuum zone 141 are independently controlled. Both first actuator 131 and first flexible vacuum supply 187 are shown coupled to vacuum source 189.

In a similar manner, additional primary vacuum port 146 of second pallet 182 is connected and fluidically coupled to second flexible vacuum supply 188. Primary vacuum port 145 of second pallet 182 is connected and fluidically coupled to second actuator 132, which is also responsible for translating second pallet 182 relative to base plate 110. Both second actuator 132 and second flexible vacuum supply 188 are shown coupled to vacuum source 189.

Figure 3A:
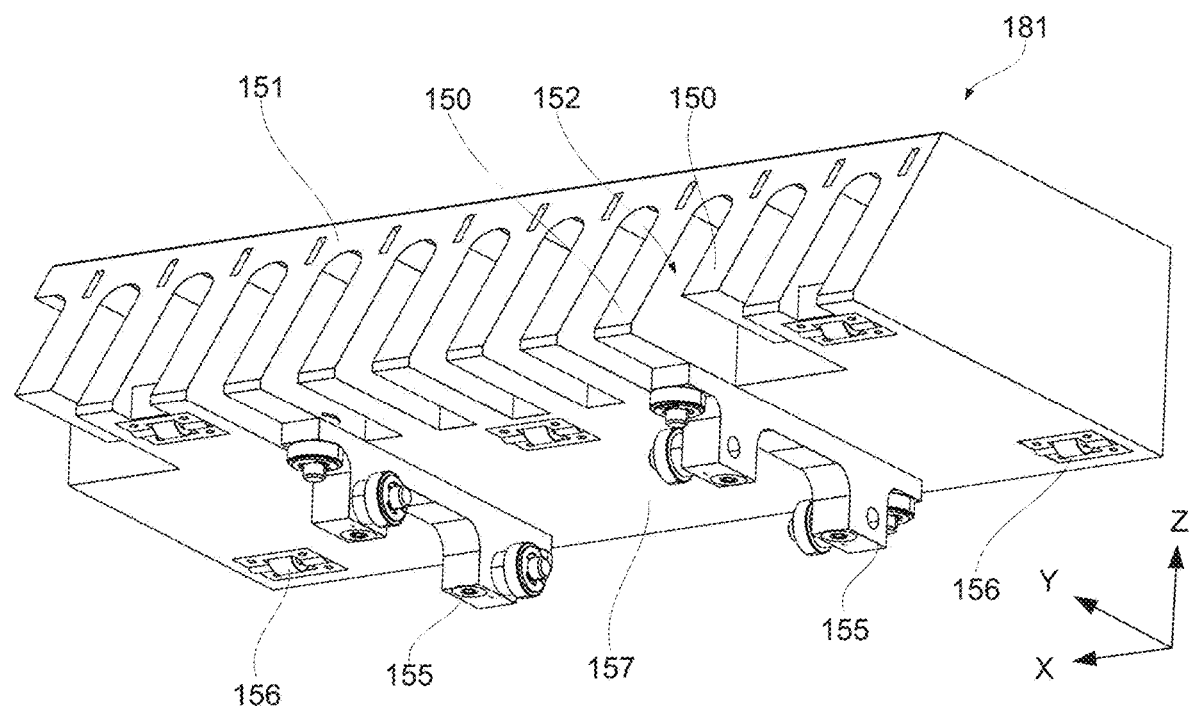
FIG. 3A is a schematic perspective bottom view of a pallet, showing engaging arms and roller bearings as well as a plurality of interlocking protrusions and a plurality of interlocking openings, in accordance with some examples of the present disclosure.
Figure 3B:
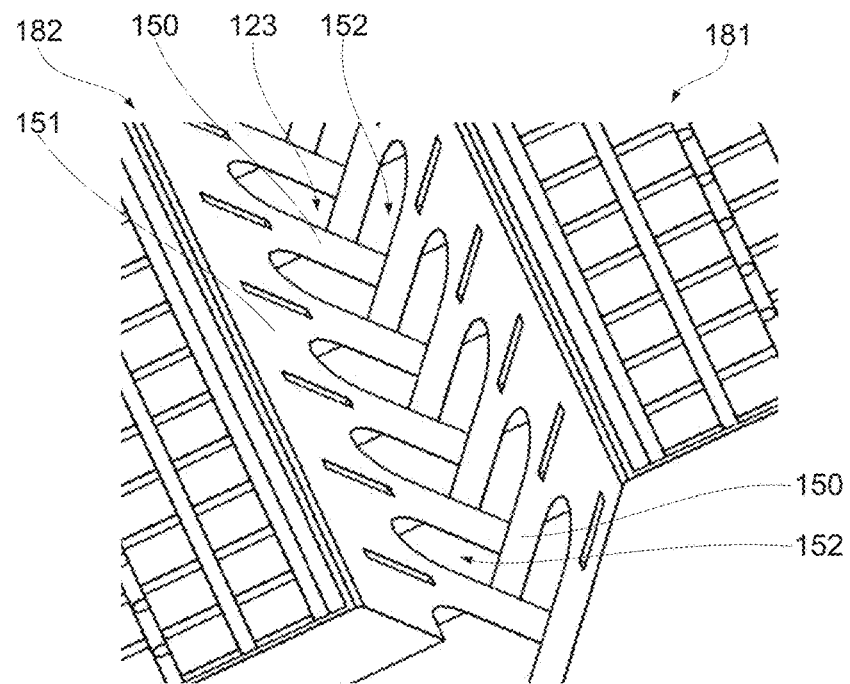
FIG. 3B is a schematic perspective top view of two interlocked pallets, showing a plurality of interlocking protrusions of one pallet protruding into a plurality of interlocking openings of the other pallet, and vice versa, collectively forming an adjustable cavity, in accordance with some examples of the present disclosure.

Referring to FIGS. 3A and 3B, in some examples, each pallet (of first plurality of pallets 121 and second plurality of pallets 122) comprises plurality of interlocking protrusions 150. A pair of adjacent protrusions is one of interlocking openings, and vice versa. Plurality of interlocking protrusions 150 of each pallet of first plurality of pallets 121 is configured to slide into plurality of interlocking openings 152 of a corresponding pallet of second plurality of pallets 122, thereby forming adjustable cavity 123. Referring to FIG. 3B, plurality of interlocking protrusions 150 of first pallet 181 protrudes into plurality of interlocking openings 152 of second pallet 182, while plurality of interlocking protrusions 150 of second pallet 182 protrudes into plurality of interlocking openings 152 of first pallet 181. This overlap forms adjustable cavity 123. Furthermore, plurality of interlocking protrusions 150, of each pallet, forms at least a portion of side surface 151 of adjustable cavity 123. As described above, plurality of interlocking protrusions 150 and separated from each other by plurality of interlocking openings 152.

Figure 1E:
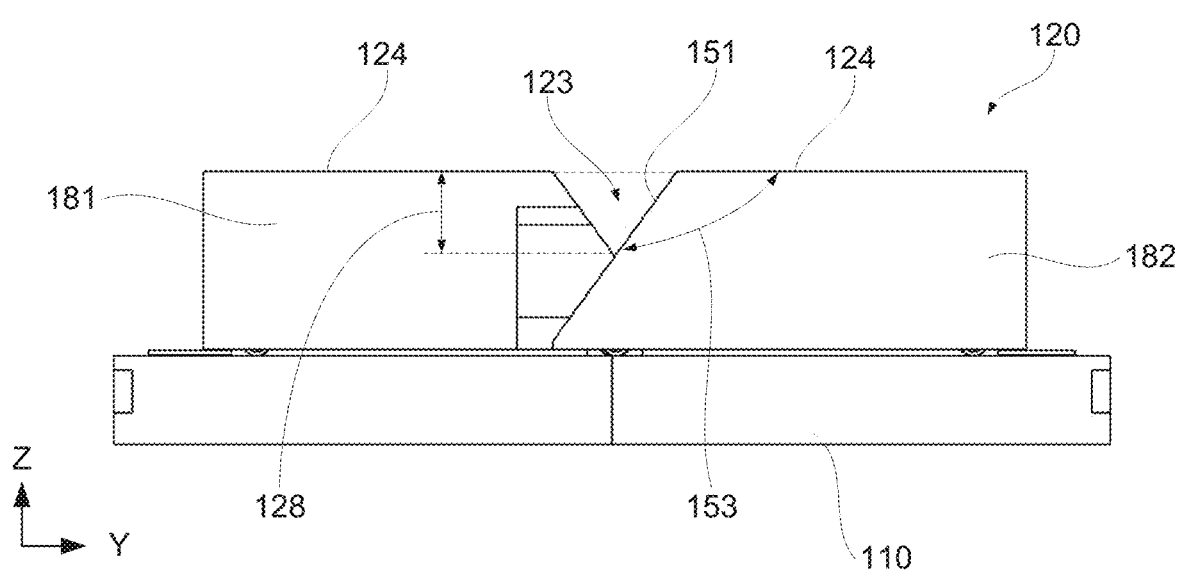
FIG. 1E is a schematic side view of a two interlocked pallets, showing various features of the adjustable cavity, in accordance with some examples of the present disclosure.

Referring to FIG. 1E, in some examples, side surface 151 of adjustable cavity 123 extends to processing surface 124 and forms obtuse angle 153 with processing surface 124, This angle and the spacing between processing surfaces 124 of the two corresponding pallets (e.g., first pallet 181 and second pallet 182) determine the cross-section of adjustable cavity 123 and eventually, the cross-section of hat portion 191 of the stringer 190. While obtuse angle 153 remains constant, the spacing between processing surfaces 124 is adjustable by moving corresponding (opposite) pallets relative to each other.

Referring to FIG. 1E, in some examples, depth 128 and the cross-section of adjustable cavity 123 is determined by the relative positions of corresponding pallets, e.g., each pallet of first plurality of pallets 121 and the corresponding one of second plurality of pallets 122, such as first pallet 181 and second pallet 182 in FIG. 1E. It should be noted that first pallet 181 and second pallet 182 are movable relative to each other, thereby depth 128 and the cross-section of adjustable cavity 123 is controllable. As described below, corresponding actuators are used to control the relative positions of first pallet 181 and second pallet 182.

Figure 3C:
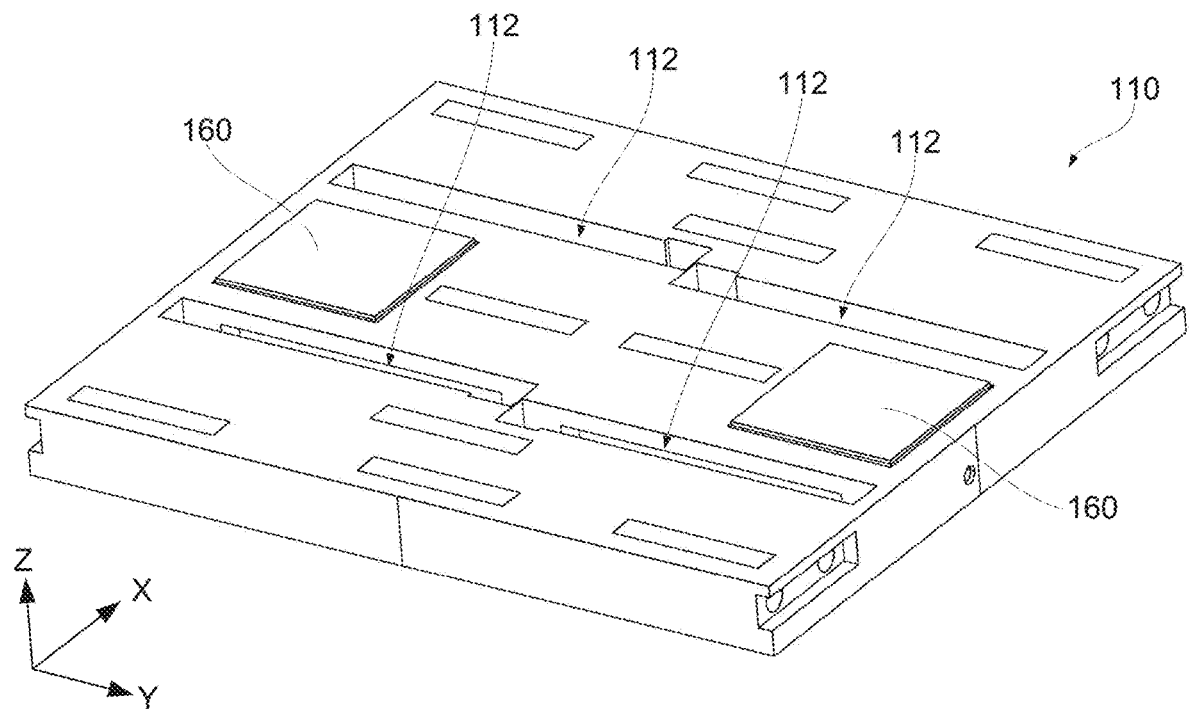
FIG. 3C is a schematic perspective view of a base plate, showing breaking mechanisms and track openings, in accordance with some examples of the present disclosure.

Referring to FIG. 3C, in some examples, base plate 110 comprises plurality of track openings 112. Each of plurality of track openings 112 is configured to receive engaging arm 155 of a pallet, which is shown in FIG. 3A. Engaging arm 155 protrudes from bottom surface 157 of the pallet and, in some examples, comprises a roller. When stringer forming system 100 is assembled, engaging arm 155 protrudes into one of plurality of track openings 112, allowing each pallet to slide relative to base plate 110, along second direction 102, parallel to processing surface 124 and to the Y-axis. This engagement prevents the pallet to move away from base plate 110 in third direction 103, perpendicular to processing surface 124 and parallel to the Z-axis. This engagement also prevents the pallet to move away from base plate 110 in first direction 101, parallel to processing surface 124 and parallel to the X-axis.

Referring to FIG. 3A, in some examples, each pallet of first plurality of pallets 121 and second plurality of pallets 122 comprises plurality of roller bearings 156. Plurality of roller bearings 156 is attached to and protrudes from bottom surface 157 of the pallet. In some examples, each pallet comprises four roller bearings 156, one on each corner of the pallet. Plurality of roller bearings 156 allows each pallet to slide relative to base plate 110 along second direction 102, parallel to processing surface 124.

Referring to FIG. 3C, in some examples, base plate 110 comprises plurality of braking mechanisms 160. When stringer forming system 100 is assembled, each of plurality of braking mechanisms 160 is positioned under a corresponding pallet, Plurality of braking mechanisms 160 is configured to control sliding of the pallets relative to base plate 110 in the Y-axis, e.g., when the hat portion of a stringer is formed and a significant load is applied along the Y-axis onto the pallets.

Figure 3D:
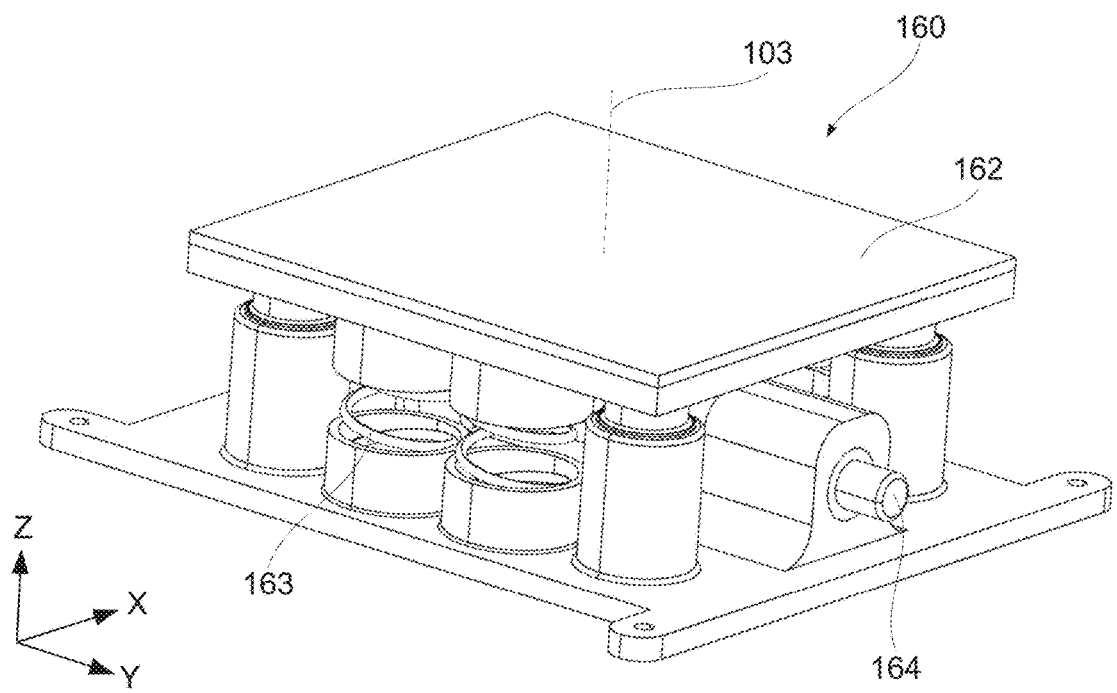
FIG. 3D is a schematic perspective view of a breaking mechanism, for installing into a base plate and selectively engaging a pallet, during operation of the stringer forming system, in accordance with some examples of the present disclosure.

Referring to FIG. 3D, each of braking mechanisms 160 comprises friction pad 162, movable in third direction 103, which is parallel to Z-axis. As described above, third direction 103 is perpendicular to processing surface 124 of the pallet, positioned over this braking mechanism. Friction pad 162 is configured to contact a corresponding pallet, e.g., one pallet of first plurality of pallets 121 or second plurality of pallets 122 to restrict sliding of this pallet in the Y-direction. Friction pad 162 is configured to contact bottom surface 157 of the pallet. In some examples, friction pad 162 is formed from a rubber. However, any other materials, providing a high friction coefficient when in contact with bottom surface 157 of the pallet, are within the scope.

Figure 3E:
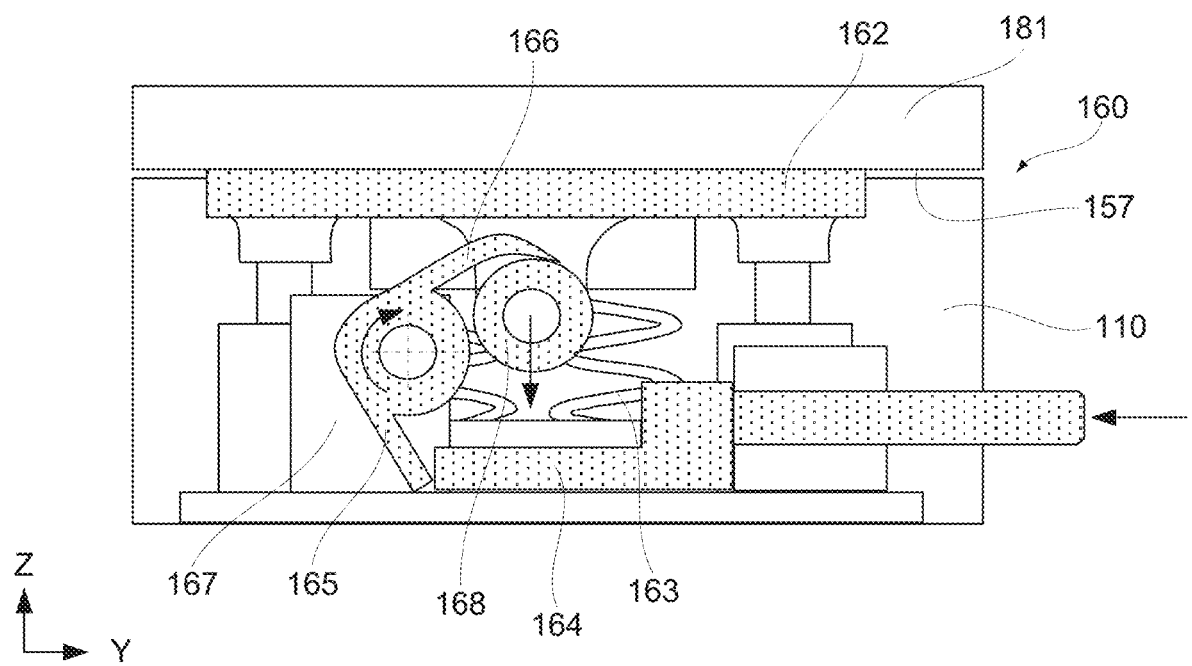
FIG. 3E is a schematic side view of a breaking mechanism, showing a friction pad of the breaking mechanism contacting a pallet, in accordance with some examples of the present disclosure.
Figure 3F:
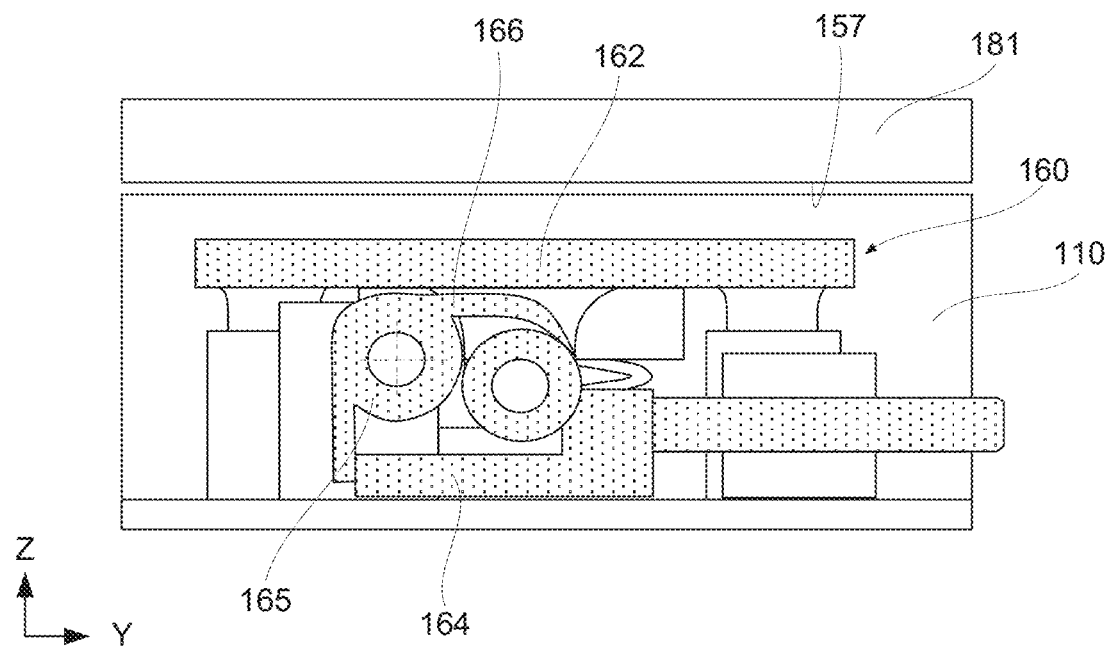
FIG. 3F is a schematic side view of the breaking mechanism in FIG. 3E, showing the friction pad retracted from the pallet, in accordance with some examples of the present disclosure.

Referring to FIGS. 3E and 3F, in some examples, each of plurality of braking mechanisms 160 further comprises spring 163, push pin 164, and translation device 165. These components are used to move friction pad 162 along the Z-axis. Specifically, spring 163 urges friction pad 162 against one pallet of first plurality of pallets 121 or second plurality of pallets 122. FIG. 3E illustrates first pallet 181, positioned above braking mechanism 160, and friction pad 162 of braking mechanism 160, pushed again bottom surface 157 of first pallet 181 by spring 163 of braking mechanism 160.

Push pin 164 is movable in second direction 102, parallel to processing surface 124 and to the Y-axis. In some examples, push pin 164 is coupled to a linear actuator, e.g., a pneumatic actuator, at the end of push pin 164 extending away from other components of braking mechanism 160. The position of push pin 164, along the Y-axis, determines the position of friction pad 162 along the Z-axis, through translation device 165.

Translation device 165 is configured to retract friction pad 162 away from bottom surface 157 of first pallet 181 as, for example, is schematically shown in FIG. 3F, or second plurality of pallets 122 and to compress spring 163 in response to push pin 164 moving in second direction 102 and engaging translation device 165. Specifically, translation device 165 comprises arm 166, pivotally coupled to stationary portion 167 of braking mechanism 160 and slidably engaging friction pad 162 or, more specifically, slidably engaging friction pad extension 168 of friction pad 162. In some examples, arm 166 has two parts, joined together at a 90' angle, effectively forming an L-shape. Friction pad extension 168 has a circular cross-section or comprises a roller to enable arm 166 to slide relative to friction pad extension 168 as, for example, is schematically shown in FIGS. 3E and 3F.

Referring to FIGS. 3E and 3F, when push pin 164 is translated to the left along the Y-axis (e.g., by an external actuator), push pin 164 forces arm 166 to rotate clockwise relative to stationary portion 167. This rotation of arm 166 pushes friction pad extension 168 and, as a result, entire friction pad 162 down (along the Z-axis) and compresses spring 163. As shown in FIG. 3F, as friction pad 162 moves down, friction pad 162 separates from and disengages bottom surface 157 of the pallet.

When push pin 164 is allowed to translate to the right along the Y-axis or is actually translated in this direction (e.g., by an external actuator), spring 163 forces friction pad 162 up (along the Z-axis). Friction pad extension 168 pushes one end of arm 166 up, causing arm 166 to rotate counterclockwise. Since push pin 164 is moved to the right, push pin 164 does not prevent this counterclockwise rotation of arm 166 and, overall, does not prevent friction pad 162 from moving up and engaging bottom surface 157 of the pallet.

Referring to FIG. 1A, in some examples, stringer forming system 100 further comprises plurality of actuators 130, each coupled to a different pallet. In some examples, plurality of actuators 130 comprises first actuator 131, second actuator 132, third actuator 133, and fourth actuator 134. Specifically, first actuator 131 is coupled to first pallet 181, second actuator 132 is coupled to second pallet 182, third actuator 133 is coupled to third pallet 183, and fourth actuator 134 is coupled to fourth pallet 184. While the references below are made to first actuator 131 and first pallet 181, one having ordinary skill in the art would understand that these features are applicable to any pair of an actuator and a pallet.

First actuator 131 is configured to slide first pallet 181 relative to base plate 110 along second direction 102, which is parallel to the Y-axis. Furthermore, first actuator 131 is configured to supply vacuum and also to reduce the pressure at primary vacuum zone 140 of first pallet 181. These features of plurality of actuators 130 will now be described in more detail.

Figure 4A:
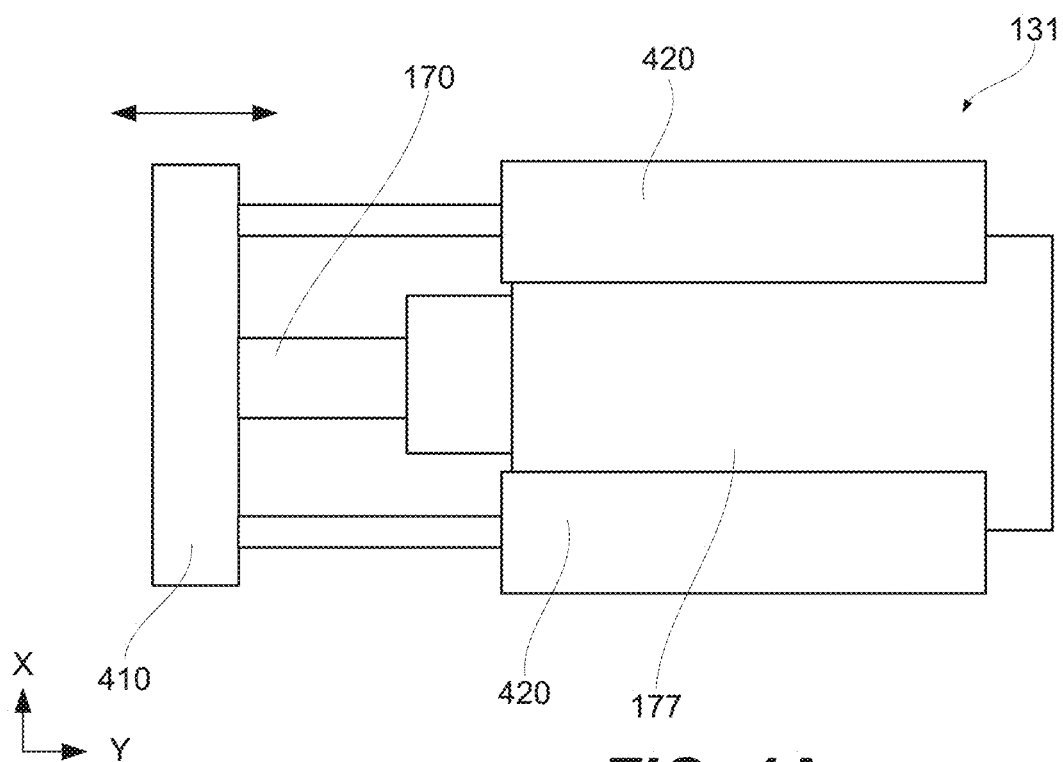
FIGS. 4A and 4B are schematic top views of an actuator, showing different positions of an extendable arm, in accordance with some examples of the present disclosure.
Figure 4B:
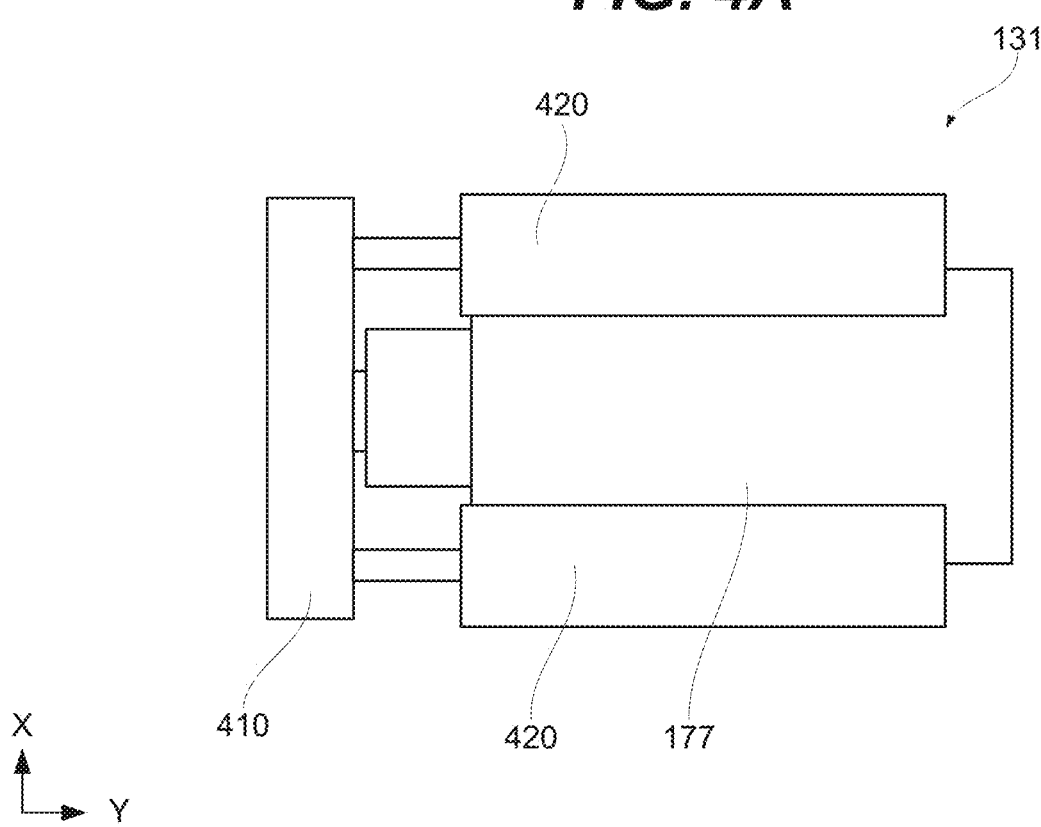

FIGS. 4A and 4B are schematic top view of first actuator 131. First actuator 131 comprises pallet engaging member 410, which is slidably coupled to actuator body 177. More specifically, pallet engaging member 410 is configured to slide relative to actuator body 177 along second direction 102, which is parallel to the Z-axis. When stringer forming system 100 is assembled, pallet engaging member 410 is attached to a corresponding pallet as, for example, is schematically shown in FIG. 1A. Sliding of pallet engaging member 410 relative to actuator body 177 causes, this pallet to slide relative to base plate 110.

Figure 4C:
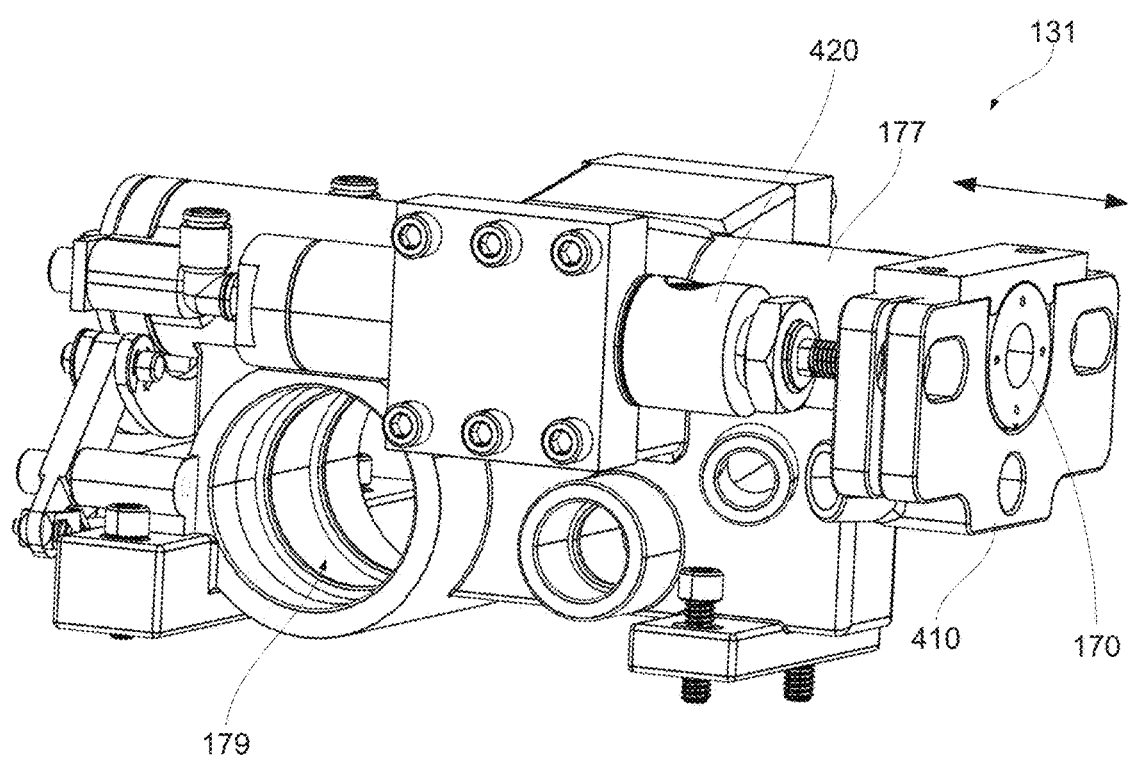
FIG. 4C is a schematic perspective view of an actuator, showing different components of the actuator, in accordance with some examples of the present disclosure.

Referring to FIGS. 4A and 4B as well as FIG. 4C, first actuator 131 comprises one or more linear drives 420, used to slide pallet engaging member 410 relative to actuator body 177. Some examples of linear drives 420 include, but are not limited to, pneumatic cylinders, electrical drives, and the like. While FIGS. 4A and 4B illustrate two linear drives 420, one having ordinary skill in the art would understand that any number of drives can be used in first actuator 131.

First actuator 131 also comprises extendable arm 170, which is slidably and rotatably coupled to actuator body 177. Extendable arm 170 is also coupled (e.g., rotatably coupled) to pallet engaging member 410. Extendable arm 170 is used to provide selective/controlled fluid coupling between primary vacuum port 145 of the pallet, to which to first actuator 131 is connected to, a vacuum supply.

Figure 4D:
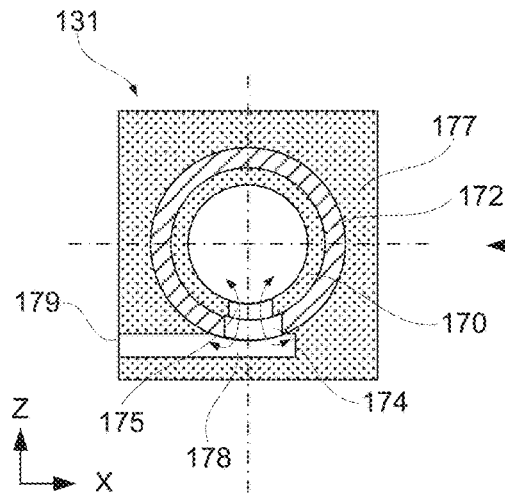
FIGS. 4D-4G are schematic cross-sectional views of an actuator, showing different rotational and linear orientations of an extendable arm relative to other components of the actuator, in accordance with some examples of the present disclosure.
Figure 4E:
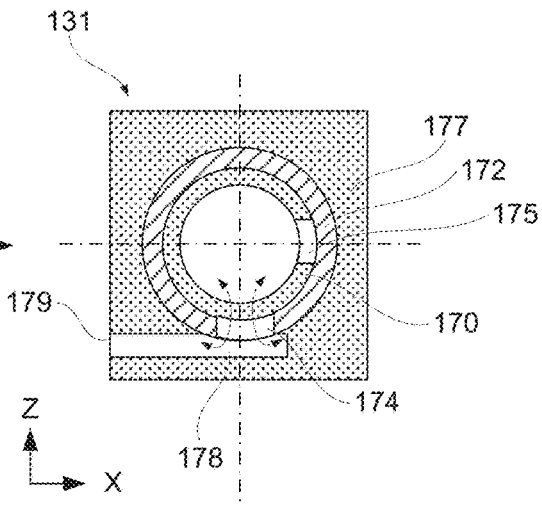

Referring to FIGS. 4D and 4E, in some examples, actuator body 177 comprises actuator primary port 179, which is connected to a vacuum source, such as common vacuum sources connected to all actuators of stringer forming system 100. Furthermore, actuator body 177 comprises actuator channel 178, extending within actuator body 177 and to actuator primary port 179. In some examples, first actuator 131 also comprises shell 172, comprising shell opening 174. Shell opening 174 is in fluidly coupled to actuator channel 178 and extending along the Y-axis. In other examples, shell 172 is integrated and/or a part of actuator body 177. In other words, shell opening 174 is part of actuator channel 178.

Extendable arm 170 is slidably and rotatably coupled to shell 172 to form and discontinue the fluid connection with primary vacuum port 145 while extendable arm 170 rotates relative to shell 172, as will now be explained. Extendable arm 170 comprises arm opening 175. In one rotational orientation of extendable arm 170 relative to shell 172 shown in FIG. 4D, arm opening 175 is fluidly coupled to shell opening 174. In this orientation, the interior of extendable arm 170 is fluidly coupled (through other components) to actuator primary port 179 and, eventually, the vacuum source. A reduced pressure is applied to primary vacuum zone 140 of the pallet coupled to this actuator, while extendable arm 170 remains in this rotational orientation.

In another rotational orientation of extendable arm 170 relative to shell 172 shown in FIG. 4E, arm opening 175 is not aligned or fluidly coupled to shell opening 174. In this orientation, the interior of extendable arm 170 is not fluidly coupled to actuator primary port 179. As such, there is no application of a reduced pressure to primary vacuum zone 140. This rotation orientation is used, for example, when primary vacuum zone 140 is not covered with composite layup 199.

Figure 4F:
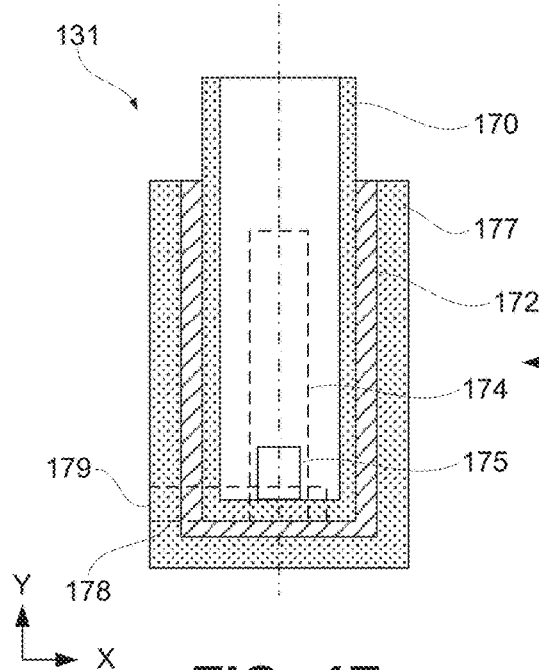
Figure 4G:
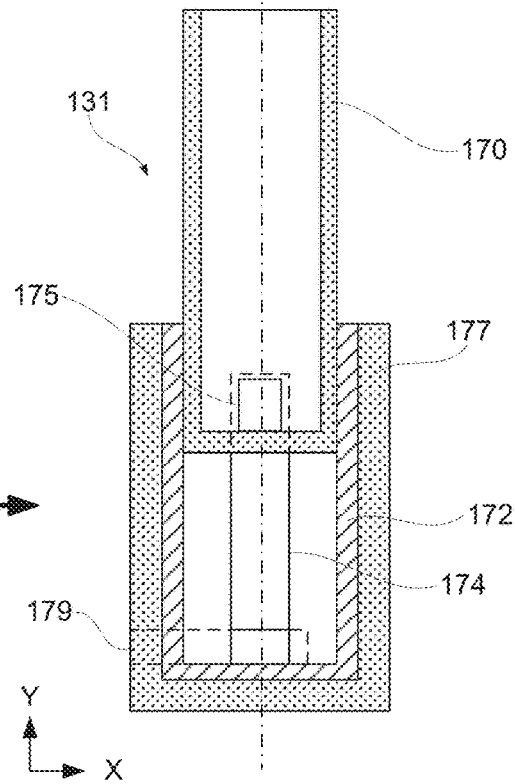

Referring to FIGS. 4F and 4G, extendable arm 170 is able to slide relative to shell 172 in the Y-direction while arm opening 175 remains fluidly coupled to shell opening 174. Shell opening 174 extends the Y-direction over the total sliding distance allowing this continuous fluid coupling. Specifically, FIG. 4F shows extendable arm 170 is a retracted state relative to shell 172, wherein arm opening 175 is fluidly coupled to shell opening 174 at one end of shell opening 174. FIG. 4G shows extendable arm 170 is an extended state relative to shell 172, wherein arm opening 175 is fluidly coupled to shell opening 174 at another end of shell opening 174. It should be noted that extendable arm 170 is rotatable relative to shell 172 at any extension state. As such, arm opening 175 is configured to be fluidly coupled or decoupled from shell opening 174 when extendable arm 170 is the retracted state, in the extended state, or any state in between. Overall, shell opening 174, which is, when aligned with arm opening 175, is in a fluid connection to primary vacuum port 145 while corresponding one of plurality of actuators 130 slides the pallet relative to base plate 110 and while extendable arm 170 slides within shell 172.

As mentioned above, a combination of two interlockable pallets may be referred to as pallet assembly 120. In some examples, pallet assembly 120 comprises first pallet 181 and second pallet 182. Each of first pallet 181 and second pallet 182 includes plurality of interlocking protrusions 150 and plurality of interlocking openings 152. Plurality of interlocking protrusions 150 of first pallet 181 is configured to slide into plurality of interlocking openings 152 of second pallet 182. Similarly, plurality of interlocking protrusions 150 of second pallet 182 is configured to slide into plurality of interlocking openings 152 of first pallet 181 thereby forming adjustable cavity 123. Each of first pallet 181 and second pallet 182 comprises processing surface 124 and primary vacuum zone 140 on processing surface 124 and fluidly connected to primary vacuum port 145, which is independently controlled.

Method Examples

Figure 5:
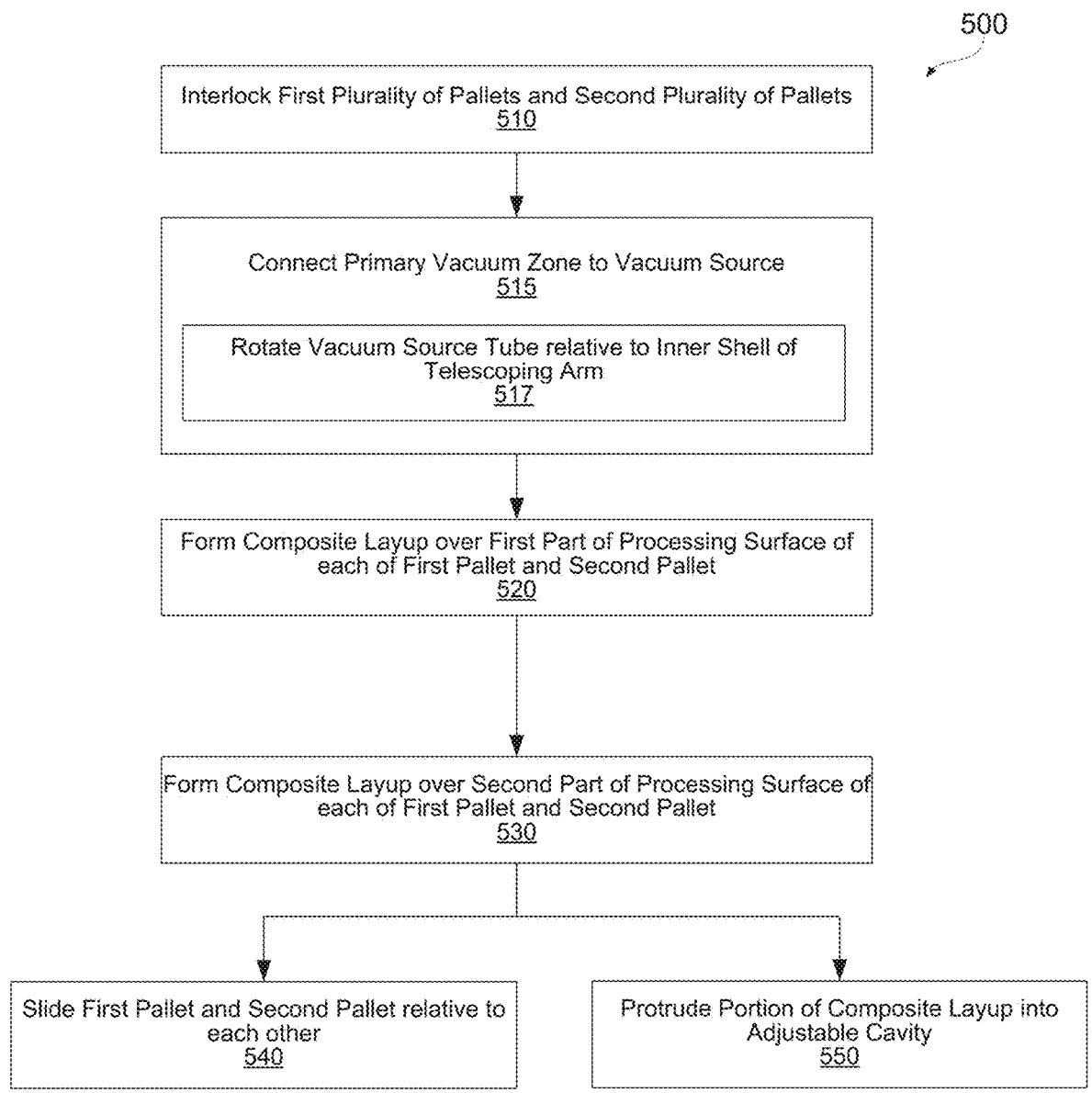
FIG. 5 is a process flowchart corresponding to a method of forming a stringer, using a stringer forming system, in accordance with some examples of the present disclosure.

FIG. 5 is a process flowchart corresponding to method 500 of forming composite stringer 190 using stringer forming system 100. Various examples of composite stringer 190 and stringer forming system 100 are described above. For example, stringer forming system 100 comprises first plurality of pallets 121 and second plurality of pallets 122, and each pallet in these plurality of pallets comprises processing surface 124 and primary vacuum zone 140, on processing surface 124. Primary vacuum zone 140 is used to support composite layup 199, while composite layup 199 is being formed on processing surface 124.

In some examples, method 500 comprises interlocking first plurality of pallets 121 and second plurality of pallets 122 on base plate 110 (block 510). As described above with reference to FIGS. 3A and 3B, each pallet comprises plurality of interlocking protrusions 150 and plurality of interlocking openings 152. During this operation, plurality of interlocking protrusions 150 of each pallet of first plurality of pallets 121 slide into plurality of interlocking openings 152 of a corresponding pallet of second plurality of pallets 122. Furthermore, plurality of interlocking openings 152 of each pallet in first plurality of pallets 121 receive plurality of interlocking protrusions 150 of the corresponding pallet of second plurality of pallets 122. This interlocking example is schematically shown in FIG. 3B.

Referring to FIG. 1E, this interlocking operation (block 510) forms adjustable cavity 123 in between first plurality of pallets 121 and second plurality of pallets 122. Depth 128 and cross-section of adjustable cavity 123 depends on the relative position of first plurality of pallets 121 and second plurality of pallets 122. In some examples, this relative position changes during execution of method 500.

Referring to FIG. 1A, first plurality of pallets 121 and second plurality of pallets 122 comprises first interlockable pallet pair 185 and second interlockable pallet pair 186. More specifically, referring to an example shown in FIG. 1A, first plurality of pallets 121 comprises first pallet 181 and third pallet 183, while second plurality of pallets 122 comprises second pallet 182 and fourth pallet 184. First pallet 181 and second pallet 182 form first interlockable pallet pair 185, while third pallet 183 and fourth pallet 184 form second interlockable pallet pair 186. First interlockable pallet pair 185 and second interlockable pallet pair 186 are relative to each other along adjustable cavity 123 or along first direction 101, extending along adjustable cavity 123.

As described above, stringer forming system 100 is configured in such a way that vacuum can be applied independently to first interlockable pallet pair 185 and second interlockable pallet pair 186. Therefore, in some examples, composite layup 199 is first formed on first interlockable pallet pair 185 while processing surface 124 of the pallets of second interlockable pallet pair 186 remains exposed and no vacuum is bled through this primary vacuum zone 140 of second interlockable pallet pair 186.

In some examples, method 500 further comprises connecting primary vacuum zone 140 of each pallet in first interlockable pallet pair 185 to vacuum source 189 (block 515). In some examples, other pallets, e.g., pallets of second interlockable pallet pair 186, are also connected to corresponding vacuum sources 189. While, in some examples, the overall vacuum source is the same for multiple different pallets, the supply of vacuum to pallets of first interlockable pallet pair 185 and the supply of vacuum to pallets of second interlockable pallet pair 186 are independently controlled.

In some examples, connecting to the vacuum source (block 515) is performed using one of plurality of actuators 130. As described above, each of plurality of actuators 130 comprises extendable arm 170, which contacts and seals (e.g., using pallet engaging member 410) against a corresponding pallet. For example, pallet engaging member 410 is equipped with one or more gaskets for sealing against the side of the pallet, comprising primary vacuum port 145. Extendable arm 170 is configured to be controllably connected to actuator primary port 179, which in turn is connected to the vacuum source. It should be noted that the operation of connecting to the vacuum source (block 515) is performed prior to forming composite layup 199 over processing surface 124 of each pallet in first interlockable pallet pair 185.

In some examples, connecting primary vacuum zone 140 of each pallet in first interlockable pallet pair 185 comprises rotating extendable arm 170 of the corresponding one of plurality of actuators 130 relative to shell 172 (block 517). As described above with reference to FIGS. 4D and 4E, the rotation extendable arm 170 and relative to shell 172 either fluidly couples or decouples primary vacuum zone 140 from the vacuum source. For example, extendable arm 170 is rotated relative to shell 172 to apply a reduced pressure to primary vacuum zone 140, e.g., right before applying composite layup 199 over primary vacuum zone 140.

Method 500 comprises forming composite layup 199 over processing surface 124 of each pallet of first interlockable pallet pair 185 (block 520). At this stage, processing surface 124 of each pallet of second interlockable pallet pair 186 is free from composite layup 199 as, e.g., schematically shown in FIG. 6A. Furthermore, during this operation, primary vacuum zone 140 of each pallet of first interlockable pallet pair 185 is subjected to a reduced pressure for supporting composite layup 199 on processing surface 124. Since composite layup 199 is positioned on first interlockable pallet pair 185, primary vacuum zone 140 of each pallet of first interlockable pallet pair 185 is not exposed, and there is no vacuum leakage, or the vacuum leakage is minimal.

However, at this stage, primary vacuum zone 140 of each pallet of second interlockable pallet pair 186 is at an ambient pressure. Processing surface 124 of each pallet of second interlockable pallet pair 186 is still exposed as, for example, is shown in FIG. 6A. If primary vacuum zone 140 is connected to a vacuum source, there will be a substantial vacuum leakage. The vacuum leakage is undesirable due to additional load on a vacuum source and potentially increasing the pressure level in other zones, operating at a reduced pressure, e.g., primary vacuum zone 140 of each pallet of first interlockable pallet pair 185.

In some examples, composite layup 199 comprises an uncured pre-impregnated reinforcing tape or fabric, which may be referred to as a prepreg. The tape or fabric comprises fibers, such as graphite fibers, embedded within a matrix material, such as a polymer or, more specifically, an epoxy or phenolic resin. In some examples, the tape or fabric is unidirectional or woven depending on the design and the degree of reinforcement desired in the resulting composite stringer.

Method 500 further comprises forming composite layup 199 over processing surface 124 of each pallet of second interlockable pallet pair 186 (block 530). This operation is performed while primary vacuum zone 140 of each pallet of second interlockable pallet pair 186 is subjected to the reduced pressure, More specifically, while primary vacuum zone 140 of each pallet of second interlockable pallet pair 186 is subjected to the reduced pressure, primary vacuum zone 140 of each pallet of first interlockable pallet pair 185 remains at the reduced pressure. FIG. 6B is a schematic illustration upon completion of this stage.

In some examples, the process of forming composite layup 199 over processing surface 124 of each pallet of second interlockable pallet pair 186 is substantially the same as the process of forming composite layup 199 over processing surface 124 of each pallet of first interlockable pallet pair 185. In fact, in some examples, the entire process is continuous, e.g., stringer forming system 100 is moving relative to a composite laying system at a set speed.

Although the examples of FIGS. 1A and 6A-B illustrates two interlockable pallet pairs, in other examples, more interlockable pallet pairs are possible. For instance, in an example, the stringer forming system includes three or more interlockable pallet pairs.

Figure 6C:
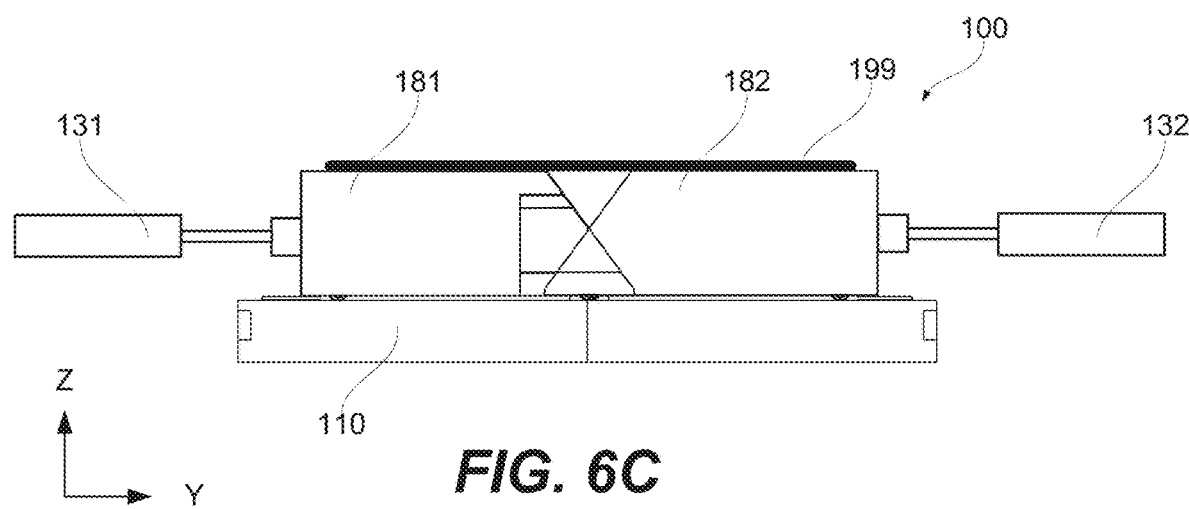
FIGS. 6C and 6D are schematic side views of a stringer forming system, showing movement of pallets, relative to each other and shaping a composite layup, in accordance with some examples of the present disclosure.
Figure 6D:
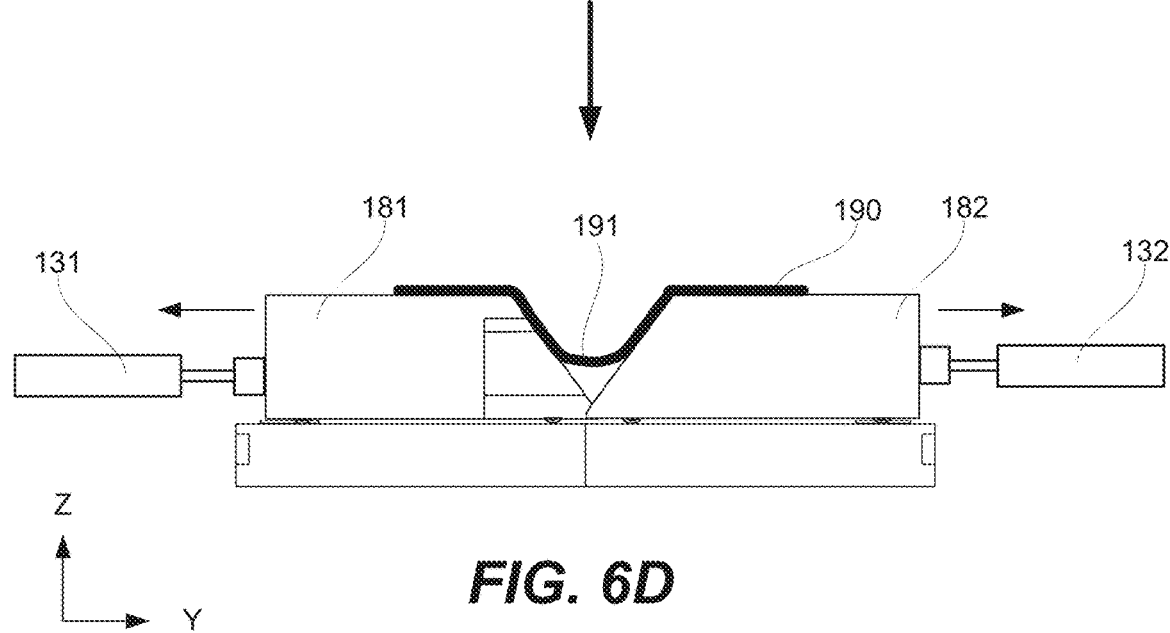

In some examples, method 500 further comprises sliding first plurality of pallets 121 and second plurality of pallets 122 relative to each on base plate 110 (block 540) and as, for example, is schematically shown in FIGS. 6C and 6D. This operation is used to, e.g., increase the depth and the cross-section of adjustable cavity 123. More specifically, in some examples, this sliding operation is performed using plurality of actuators 130. The sliding is performed, e.g., to shape composite layup 199.

During this sliding operation, composite layup 199 is supported on processing surface 124 of each pallet with the reduced pressure, applied to primary vacuum zone 140. More specifically, first plurality of pallets 121 and second plurality of pallets 122 are slid relative to each while primary vacuum zone 140 of each pallet of second interlockable pallet pair 186 is continuously subjected to a reduced pressure.

In some examples, method 500 further comprises protruding a portion of composite layup 199 into adjustable cavity 123 (block 550). This operation forms hat portion 191 of composite stringer 190. Furthermore, this operation is performed while sliding first plurality of pallets 121 and second plurality of pallets 122 relative to each.

Aircraft Examples

In some examples, methods and systems described above are used on aircraft and, more generally, by the aerospace industry. Specifically, these methods and systems can be used during fabrication of aircraft as well as during aircraft service and maintenance.

Figure 7:
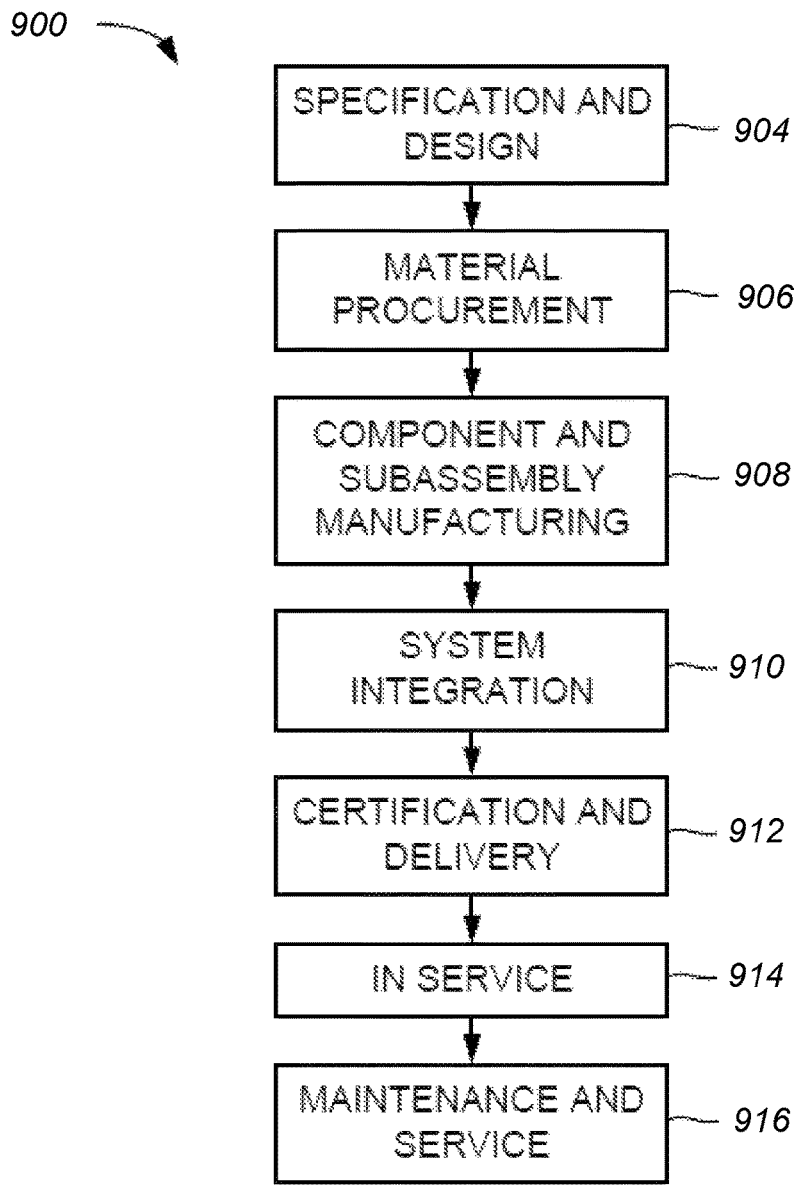
FIG. 7 is a process flowchart corresponding to a method for manufacturing and service of the aircraft.
Figure 8:
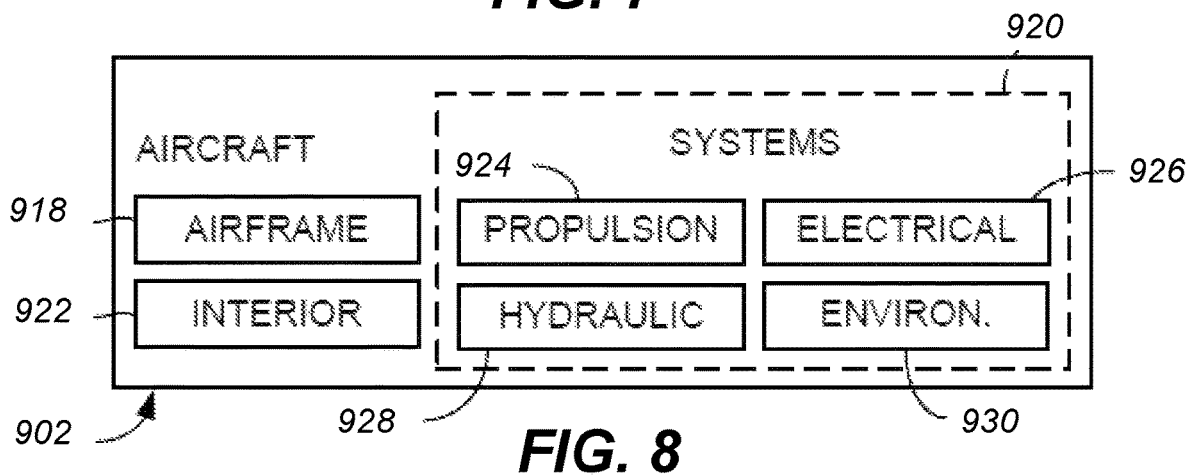
FIG. 8 illustrates a block diagram of an example of an aircraft, in accordance with some examples.

Accordingly, the apparatus and methods described above are applicable for aircraft manufacturing and service method 900 as shown in FIG. 7 and for aircraft 902 as shown in FIG. 8. During pre-production, method 900 includes specification and design 904 of aircraft 902 and material procurement 906. During production, component and subassembly manufacturing 908 and system integration 910 of aircraft 902 takes place. Thereafter, aircraft 902 goes through certification and delivery 912 in order to be placed in service 914. While in service by a customer, aircraft 902 is scheduled for routine maintenance and service 916, which also includes modification, reconfiguration, refurbishment, and so on.

In some examples, each of the processes of method 900 is performed or carried out by a system integrator, a third party, and/or an operator, e.g., a customer. For the purposes of this description, a system integrator includes without limitation any number of aircraft manufacturers and major-system subcontractors; a third party includes without limitation any number of venders, subcontractors, and suppliers; and an operator can be an airline, leasing company, military entity, service organization, and so on.

As shown in FIG. 8, aircraft 902 produced by method 900 includes airframe 918 with plurality of systems 920, and interior 922. Examples of systems 920 include one or more of propulsion system 924, electrical system 926, hydraulic system 928, and environmental system 930. Any number of other systems can be included. Although an aerospace example is shown, the principles of the examples described herein is applied to other industries, such as the automotive industry.

Apparatus and methods presented herein can be employed during any one or more of the stages of method 900. For example, components or subassemblies corresponding to manufacturing 908 are fabricated or manufactured in a manner similar to components or subassemblies produced while aircraft 902 is in service. Also, one or more apparatus examples, method examples, or a combination thereof is utilized during manufacturing 908 and system integration 910, for example, by substantially expediting assembly of or reducing the cost of an aircraft 902. Similarly, one or more of apparatus examples, method examples, or a combination thereof is utilized while aircraft 902 is in service, for example and without limitation, to maintenance and service 916.

Further Examples

Further, description includes examples according to following clauses:

Clause 1. A stringer forming system for fabricating a composite stringer, the stringer forming system comprising:
a base plate;
a first plurality of pallets, slidably coupled to the base plate; and
a second plurality of pallets, slidably coupled to the base plate and configured to interlock with the first plurality of pallets and to form an adjustable cavity, when interlocked with the first plurality of pallets,
wherein the adjustable cavity is configured to receive a hat portion of the composite stringer, wherein each pallet of the first plurality of pallets and the second plurality of pallets comprises a processing surface and a primary vacuum zone, on the processing surface, fluidly connected to a primary vacuum port, and wherein the primary vacuum port of each pallet of the first plurality of pallets and of the second plurality of pallets is independently controlled.

Clause 2. The stringer forming system of clause 1, wherein pallets of the first plurality of pallets are offset relative each other along a first direction, extending along the adjustable cavity.

Clause 3. The stringer forming system of any one of clauses 1-2, wherein the primary vacuum zone is formed by a plurality of vacuum channels, forming a grid and extending through the processing surface.

Clause 4. The stringer forming system of any one of clauses 1-3, wherein each pallet of the first plurality of pallets and the second plurality of pallets comprises an edge vacuum zone, fluidly connected to an edge vacuum port, wherein the primary vacuum zone is positioned between the edge vacuum zone and the adjustable cavity.

Clause 5. The stringer forming system of any one of clauses 1-4, wherein each pallet of the first plurality of pallets and the second plurality of pallets comprises a plurality of interlocking protrusions, forming a side surface of the adjustable cavity and separated from each other by a plurality of interlocking openings.

Clause 6. The stringer forming system of clause 5, wherein the side surface of the adjustable cavity extends to and forms an obtuse angle with the processing surface.

Clause 7. The stringer forming system of any one of clauses 5-6, wherein the plurality of interlocking protrusions of each pallet of the first plurality of pallets is configured to slide into the plurality of interlocking openings of a corresponding pallet of the second plurality of pallets, thereby forming the adjustable cavity.

Clause 8. The stringer forming system of any one of clauses 1-7, wherein a depth and a cross-section of the adjustable cavity is determined by relative positions of each pallet of the first plurality of pallets and a corresponding one of second plurality of pallets.

Clause 9. The stringer forming system of any one of clauses 1-8, wherein:

the base plate comprises a plurality of track openings, each pallet of the first plurality of pallets and the second plurality of pallets comprises an engaging arm, protruding into one of the plurality of track openings allowing each pallet to slide relative to the base plate, along a second direction, parallel to the processing surface, and preventing each pallet to move away from the base plate in a third direction, perpendicular to the processing surface.

Clause 10. The stringer forming system of any one of clauses 1-9, wherein each pallet of the first plurality of pallets and the second plurality of pallets comprises a plurality of roller bearings, allowing each pallet to slide relative to the base plate along a second direction, parallel to the processing surface.

Clause 11. The stringer forming system of any one of clauses 1-10, wherein the base plate comprises a plurality of braking mechanisms, each comprising a friction pad, movable in a third direction perpendicular to the processing surface and configured to contact one pallet of the first plurality of pallets or the second plurality of pallets to restrict sliding of the one pallet.

Clause 12. The stringer forming system of clause 11, wherein:

each of the plurality of braking mechanisms further comprises a spring, a push pin, and a translation device, the spring urges the friction pad against the one pallet of the first plurality of pallets or the second plurality of pallets, the push pin is movable in a second direction parallel to the processing surface; and the translation device is configured to retract the friction pad away from the one pallet of the first plurality of pallets or the second plurality of pallets and to compress the spring in response to the push pin moving in the second direction and engaging the translation device.

Clause 13. The stringer forming system of clause 12, wherein the translation device comprises an arm, pivotally coupled to a stationary portion of a corresponding one of the plurality of the braking mechanisms and slidably engaging the friction pad.

Clause 14. The stringer forming system of any one of clauses 1-13, further comprising a plurality of actuators, each coupled to one pallet of the first plurality of pallets and the second plurality of pallets and configured to slide the one pallet relative to the base plate.

Clause 15. The stringer forming system of clause 14, wherein each of the plurality of actuators comprises an extendable arm, fluidly coupled to the primary vacuum port of a corresponding one of the first plurality of pallets and the second plurality of pallets.

Clause 16. The stringer forming system of clause 15, wherein:

the extendable arm is slidably coupled to a shell of a corresponding one of the plurality of actuators, the extendable arm comprises an arm opening, the shell comprises a shell opening, which is, when aligned with the arm opening, is in a fluid connection to the primary vacuum port while the corresponding one of the plurality of actuators slides a corresponding one of the first plurality of pallets or the second plurality of pallets relative to the base plate and while the extendable arm slides within the shell.

Clause 17. The stringer forming system of clause 16, wherein the extendable arm is further rotatably coupled relative to the shell to form and discontinue the fluid connection with the primary vacuum port while the extendable arm rotates relative to the shell.

Clause 18. The stringer forming system of any one of clauses 1-17, wherein each pallet of the first plurality of pallets and the second plurality of pallets comprises an additional primary vacuum zone, on the processing surface and fluidly connected to an additional primary vacuum port, wherein the additional primary vacuum port is independently controlled.

Clause 19. The stringer forming system of any one of clauses 1-18, wherein each pallet of the plurality of first pallets and the second plurality of pallets comprises an edge vacuum zone, fluidly connected to an edge vacuum port and controlled independently from the primary vacuum zone, wherein the primary vacuum zone is positioned between the edge vacuum zone and the adjustable cavity.

Clause 20. A pallet assembly comprising:

a first pallet; and a second pallet, wherein each of the first pallet and the second pallet comprises a plurality of interlocking protrusions and a plurality of interlocking openings such that the plurality of interlocking protrusions of the first pallet is configured to slide into the plurality of interlocking openings of the second pallet and such that the plurality of interlocking protrusions of the second pallet is configured to slide into the plurality of interlocking openings of the first pallet thereby forming an adjustable cavity, and wherein each of the first pallet and the second pallet comprises a processing surface and a primary vacuum zone on the processing surface and fluidly connected to a primary vacuum port, which is independently controlled.

Clause 21. The pallet assembly of clause 20, wherein each of the first pallet and the second pallet comprises an additional primary vacuum zone, on the processing surface and fluidly connected to an additional primary vacuum port, which is independently controlled.

Clause 22. The pallet assembly of any one of clauses 20-21, wherein the primary vacuum zone is formed by a plurality of vacuum channels, forming a grid and extending through the processing surface.

Clause 23. The pallet assembly of any one of clauses 20-22, wherein each of the first pallet and the second pallet comprises an edge vacuum zone, fluidly connected to an edge vacuum port, wherein the primary vacuum zone is positioned between the edge vacuum zone and the adjustable cavity.

Clause 24. The pallet assembly of any one of clauses 20-23, wherein the plurality of interlocking protrusions, forms a side surface of the adjustable cavity such that the side surface of the adjustable cavity extends to and forms an obtuse angle with the processing surface.

Clause 25. The pallet assembly of any one of clauses 20-24, wherein each of the first pallet and the second pallet comprises a plurality of roller bearings allowing each of the first pallet and the second pallet to slide relative to a base plate, along a second direction, parallel to the processing surface.

Clause 26. A method of forming a stringer using a stringer forming system, the method comprising:
  interlocking a first plurality of pallets and a second plurality of pallets on a base plate thereby forming an adjustable cavity in between the first plurality of pallets and the second plurality of pallets,
    wherein the first plurality of pallets and the second plurality of pallets comprise a first interlockable pallet pair and a second interlockable pallet pair, offset relative to the first interlockable pallet pair along the adjustable cavity, and
    wherein each pallet of the first plurality of pallets and of the second plurality of pallets comprises a processing surface and a primary vacuum zone on the processing surface;
  forming a composite layup over the processing surface of each pallet of the first interlockable pallet pair while the primary vacuum zone of each pallet of the first interlockable pallet pair is subjected to a reduced pressure,
    wherein, while the primary vacuum zone of each pallet of the first interlockable pallet pair is subjected to a reduced pressure, the primary vacuum zone of each pallet of the second interlockable pallet pair is at an ambient pressure and the processing surface of each pallet of the second interlockable pallet pair is free from the composite layup; and
  forming the composite layup over the processing surface of each pallet of the second interlockable pallet pair while the primary vacuum zone of each pallet of the second interlockable pallet pair is subjected to the reduced pressure.

Clause 27. The method of clause 26, wherein, while the primary vacuum zone of each pallet of the second interlockable pallet pair is subjected to the reduced pressure, the primary vacuum zone of each pallet of the first interlockable pallet pair remains at the reduced pressure.

Clause 28. The method of any one of clauses 26-27, further comprising:
  sliding the first plurality of pallets and the second plurality of pallets relative to each on the base plate thereby increasing a depth and a cross-section of the adjustable cavity; and
  while sliding the first plurality of pallets and the second plurality of pallets relative to each, protruding a portion of the composite layup into the adjustable cavity thereby forming a hat portion of the stringer.

Clause 29. The method of any one of clauses 26-28, further comprising, prior to forming the composite layup over the processing surface of each pallet of the first interlockable pallet pair, connecting the primary vacuum zone of each pallet of the first interlockable pallet pair to a corresponding vacuum source using a corresponding one of a plurality of actuators.

Clause 30. The method of clause 29, wherein connecting the primary vacuum zone of each pallet of the first interlockable pallet pair to the corresponding vacuum source comprises rotating an extendable arm of the corresponding one of the plurality of actuators relative to a shell of the corresponding one of a plurality of actuators.

Clause 31. The method of any one of clauses 29-30, further comprising sliding the first plurality of pallets and the second plurality of pallets relative to each other using the plurality of actuators.

Clause 32. The method of clause 31, wherein the first plurality of pallets and the second plurality of pallets are slid relative to each while the primary vacuum zone of each pallet of the second interlockable pallet pair is continuously subjected to a reduced pressure.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A stringer forming system for fabricating a composite stringer, the stringer forming system comprising:
  a base plate;
  a first plurality of pallets, slidably coupled to the base plate; and
  a second plurality of pallets, slidably coupled to the base plate and configured to interlock with the first plurality of pallets and to form an adjustable cavity, when interlocked with the first plurality of pallets,
  wherein the adjustable cavity is configured to receive a hat portion of the composite stringer,
  wherein each pallet of the first plurality of pallets and the second plurality of pallets comprises a processing surface and a primary vacuum zone, on the processing surface, fluidly connected to a primary vacuum port, and
  wherein the primary vacuum port of each pallet of the first plurality of pallets and of the second plurality of pallets is independently controlled.

2. The stringer forming system of claim 1, wherein pallets of the first plurality of pallets are offset relative each other along a first direction, extending along the adjustable cavity.

3. The stringer forming system of claim 1, wherein the primary vacuum zone is defined by a plurality of vacuum channels, forming a grid and extending through the processing surface.

4. The stringer forming system of claim 1, wherein each pallet of the first plurality of pallets and the second plurality of pallets comprises a plurality of interlocking protrusions, forming a side surface of the adjustable cavity and separated from each other by a plurality of interlocking openings.

5. The stringer forming system of claim 4, wherein the plurality of interlocking protrusions of each pallet of the first plurality of pallets is configured to slide into the plurality of interlocking openings of a corresponding pallet of the second plurality of pallets, thereby forming the adjustable cavity.

6. The stringer forming system of claim 1, wherein:
the base plate comprises a plurality of track openings,
each pallet of the first plurality of pallets and the second plurality of pallets comprises an engaging arm, protruding into one of the plurality of track openings allowing each pallet to slide relative to the base plate, along a second direction, parallel to the processing surface, and preventing each pallet to move away from the base plate in a third direction, perpendicular to the processing surface.

7. The stringer forming system of claim 1, wherein the base plate comprises a plurality of braking mechanisms, each comprising a friction pad, movable in a third direction perpendicular to the processing surface and configured to contact one pallet of the first plurality of pallets or the second plurality of pallets to restrict sliding of the one pallet.

8. The stringer forming system of claim 7, wherein:
each of the plurality of braking mechanisms further comprises a spring, a push pin, and a translation device,
the spring urges the friction pad against the one pallet of the first plurality of pallets or the second plurality of pallets,
the push pin is movable in a second direction parallel to the processing surface; and
the translation device is configured to retract the friction pad away from the one pallet of the first plurality of pallets or the second plurality of pallets and to compress the spring in response to the push pin moving in the second direction and engaging the translation device.

9. The stringer forming system of claim 1, further comprising a plurality of actuators, each coupled to one pallet of the first plurality of pallets and the second plurality of pallets and configured to slide the one pallet relative to the base plate.

10. The stringer forming system of claim 9, wherein each of the plurality of actuators comprises an extendable arm, fluidly coupled to the primary vacuum port of a corresponding one of the first plurality of pallets and the second plurality of pallets.

11. The stringer forming system of claim 10, wherein:
the extendable arm is slidably coupled to a shell of a corresponding one of the plurality of actuators,
the extendable arm comprises an arm opening,
the shell comprises a shell opening, which is, when aligned with the arm opening, is in a fluid connection to the primary vacuum port while the corresponding one of the plurality of actuators slides a corresponding one of the first plurality of pallets or the second plurality of pallets relative to the base plate and while the extendable arm slides within the shell.

12. The stringer forming system of claim 11, wherein the extendable arm is further rotatably coupled relative to the shell to form and discontinue the fluid connection with the primary vacuum port while the extendable arm rotates relative to the shell.

13. The stringer forming system of claim 9, wherein each pallet of the first plurality of pallets and the second plurality of pallets comprises an additional primary vacuum zone, on the processing surface and fluidly connected to an additional primary vacuum port, wherein the additional primary vacuum port is independently controlled.

14. The stringer forming system of claim 1, wherein each pallet of the first plurality of pallets and the second plurality of pallets comprises an edge vacuum zone, fluidly connected to an edge vacuum port and controlled independently from the primary vacuum zone, wherein the primary vacuum zone is positioned between the edge vacuum zone and the adjustable cavity.

15. The stringer forming system of claim 1, wherein each pallet of the first plurality of pallets and the second plurality of pallets comprises an edge vacuum zone, fluidly connected to an edge vacuum port, wherein the primary vacuum zone is positioned between the edge vacuum zone and the adjustable cavity.

16. The stringer forming system of claim 4, wherein the side surface of the adjustable cavity extends to and forms an obtuse angle with the processing surface.

17. The stringer forming system of claim 1, wherein a depth and a cross-section of the adjustable cavity is determined by relative positions of each pallet of the first plurality of pallets and a corresponding one of second plurality of pallets.

18. The stringer forming system of claim 1, wherein each pallet of the first plurality of pallets and the second plurality of pallets comprises a plurality of roller bearings, allowing each pallet to slide relative to the base plate along a second direction, parallel to the processing surface.

19. The stringer forming system of claim 8, wherein the translation device comprises an arm, pivotally coupled to a stationary portion of a corresponding one of the plurality of the braking mechanisms and slidably engaging the friction pad.

20. The stringer forming system of claim 1, wherein the primary vacuum port of each pallet of the first plurality of pallets and of the second plurality of pallets is coupled to a same vacuum source.

* * * * *